(12) United States Patent
Williams et al.

(10) Patent No.: US 9,273,184 B1
(45) Date of Patent: Mar. 1, 2016

(54) SYNTHESIS OF HIGHLY FLUORINATED AMINES FOR USE IN POLYMERS AND BIOMATERIALS

(75) Inventors: Travis J. Williams, Los Angeles, CA (US); Emine Boz, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 898 days.

(21) Appl. No.: 13/543,215

(22) Filed: Jul. 6, 2012

Related U.S. Application Data

(63) Continuation-in-part of application No. PCT/US2010/062104, filed on Dec. 24, 2010.

(60) Provisional application No. 61/504,883, filed on Jul. 6, 2011, provisional application No. 61/290,053, filed on Dec. 24, 2009.

(51) Int. Cl.
*A61K 9/14* (2006.01)
*C08G 65/00* (2006.01)

(52) U.S. Cl.
CPC .................................. *C08G 65/007* (2013.01)

(58) Field of Classification Search
CPC ....................................................... A61K 8/70
See application file for complete search history.

(56) References Cited

U.S. PATENT DOCUMENTS

2007/0184085 A1   8/2007   Radhakrishnan et al.

FOREIGN PATENT DOCUMENTS

WO   2009064964 A2   5/2009

OTHER PUBLICATIONS

Hoang et al, Aqueous Solubilization of Highly Fluorinated Molecules by Semifluorinated surfactants, 2004, 20(18), 7347-7350.*
International Search Report mailed May 31, 2011 for PCT/US2010/062104, Filed Dec. 24, 2010, 5 pgs.
Caravan, P. et al., "Gadolinium(III) Chelates as MRI Contrast Agents: Structure, Dynamics, and Applications," Chem. Rev. 1999, 99, pp. 2293-2352.
Duimstra, J.A. et al., "A Gadolinium Chelate for Detection of β-Glucuronidase: A Self-lmmolative Approach," J. Am. Chem. Soc. 2005, 127, pp. 12847-12855.
Li, W. et al., "Mechanistic Studies of a Calcium-Dependent MRI Contrast AGent," Inorganic Chemistry, vol. 41, No. 15, 2002, pp. 4018-4024.
Louie, A.Y. et al., "In vivo visualization of gene expression using magnetic resonance imaging," Nature Biotechnology, vol. 18, Mar. 2000, pp. 321-325.
Li, W. et al., "A Calcium-Sensitive Magnetic Resonance Imaging Contrast Agent," J. Am. Chem. Soc. 1999, 121, pp. 1413-1414.
Major, J.L. et al., "Mechanisms of ZnII-Activated Magnetic Resonance Imaging Agents, "Inorganic Chemistry, vol. 47, No. 22, 2008, pp. 10788-10795.

(Continued)

*Primary Examiner* — Paul Dickinson
(74) *Attorney, Agent, or Firm* — Brooks Kushman P.C.

(57) ABSTRACT

A method for forming a fluorinated compound includes a step of forming a sulfonate ester of a polyethylene glycol. The sulfonate ester is then reacted with a fluorinated diol in the presence of a base such that the polyethylene glycol is attached to one of the hydroxyl groups in the fluorinated diol. The other hydroxyl group in the fluorinated diol is reacted is converted into a leaving group and reacted with an number of nucleophiles. Complexes of the fluorinated compounds that as useful in Magnetic Resonance Imaging are also provided.

17 Claims, 10 Drawing Sheets

(56) References Cited

OTHER PUBLICATIONS

Moats, R.A. et al., "A "Smart" Magnetic Resonance Imaging Agent That Reports on Specific Enzymatic Activity," Angew. Chem. Int. Ed. Engl. 1997, 36, No. 7, pp. 726-728.

Major, J.L. et al., "The synthesis and in vitro testing of a zinc-activated MRI contrast agent," PNAS, Aug. 28, 2007, vol. 104, No. 35, pp. 13881-13886.

Parac-Vogt, T.N. et al., "Gadolinium DTPA-Monoamide Complexes Incorporated into Mixed Micelles as Possible MRI Contrast Agents," Eur. J. Inorg. Chem. 2004, pp. 3538-3543.

Raymond, K.N. et al., "Next Generation, High Relaxivity Gadolinium MRI Agents," Bioconjugate Chem. 2005, 16, pp. 3-8.

Zeng, Z. et al. "Polyfluoroalkyl, Polyethylene Glycol, 1,4-Bismethylenebenzene, or 1,4-Bismethylene-2,3,5,6- Tetrafluoro-benzene Bridged Functionalized Dicationic Ionic Liquids: Synthesis and Properties as High Temperature Lubricants," Chem. Mater. 2008, 20, pp. 2719-2726.

Urbanczyk-Pearson, L.M. et al., "Mechanistic Investigation of β-Galactosidase-Activated MR Contrast Agents," Inorg. Chem. 2008, 47, pp. 56-58.

Urbanczyk-Pearson, L.M. et al., "Preparation of Magnetic resonance contrast agents activated by β-Galactosidase," Nature Protocols, vol. 3. No. 3, 2008, pp.

* cited by examiner

SYNTHESIS OF HIGHLY FLUORINATED AMINES FOR USE IN POLYMERS AND BIOMATERIALS

CROSS-REFERENCE TO RELATED APPLICATIONS

This application is a continuation in part of PCT Patent Application No. PCT/US10/62104 filed Dec. 24, 2010, which claims the benefit of U.S. provisional Application No. 61/290,053 filed Dec. 24, 2009, the entire disclosures of which are incorporated herein by reference. This application also claims the benefit of U.S. provisional Application No. 61/504,883 filed Jul. 6, 2011, the entire disclosure of which is incorporated herein by reference.

STATEMENT REGARDING FEDERALLY SPONSORED RESEARCH OR DEVELOPMENT

The invention was made with Government support under Contract No. DBI-0821671. The Government has certain rights to the invention.

FIELD OF THE INVENTION

In at least one aspect, the present invention relates methods and application of highly fluorinated compounds.

BACKGROUND OF THE INVENTION

Fluorinated amphiphiles are an important class of compounds because of their tendency to self-assemble into nano-structures such as monolayers, micelles, or vesicles, in a fashion distinct from their hydrocarbon-based counterparts. Particularly, amine and guanidine-terminated molecules in this class can potentially decorate phosphate-rich biomolecules through selective non-covalent interactions such as hydrogen bonding.

While syntheses of several highly fluorinated amphiphiles or surfactants have been reported, amine- and guanidine-functionalized fluorocarbons remain largely under-addressed despite the potential synthetic utility of nitrogen-containing groups as functionalization handles and biochemical tools. The known synthetic routes to highly fluorinated amines have drawbacks: for example, highly fluorinated amines can be prepared from routes such as fluoroalkylation of ammonia with an alkyl chloride, hydrogenation of fluoro-organic azides, and the Gabriel synthesis, with the latter two involving high-temperature displacement of fluoroalkyl tosylates. These methods are of limited scope or involve harsh conditions incompatible with some biologically relevant substrates.

Accordingly, there is a need for improved methods of making amphiphiles that are useful for biochemical applications.

SUMMARY OF THE INVENTION

The present invention solves one or more problems of the prior art by providing in at least one embodiment a method for forming a fluorinated compound is provided. The method includes a step of tosylating a compound having formula 1 to form a compound having formula 2:

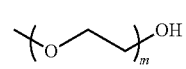

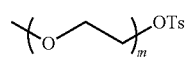

The compound having formula (2) is reacted with a compound having formula (3) to form a compound having formula (4):

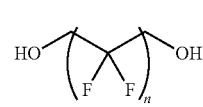

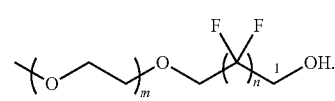

The hydroxyl group bonded to the carbon labeled "1" of the compound having formula (4) is converted to a leaving group to form the compound having formula (5):

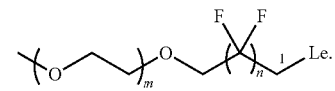

The compound with the leaving group is reacted with a nucleophile to the compound having formula (6):

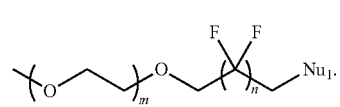

In formulae 1-6, Le is a leaving group, R is a $C_{1-6}$ alkyl, m is an integer from 3 to 7, n is an integer from 3 to 10, and $Nu_1$ is a portion of the nucleophile that bonds to the carbon atom labeled 1.

In another embodiment, a complex having formula (15) or (16) is provided:

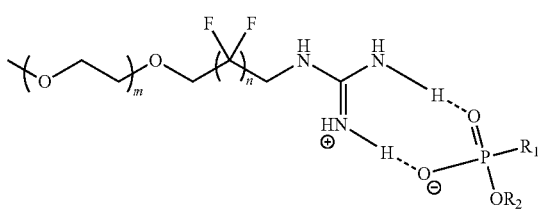

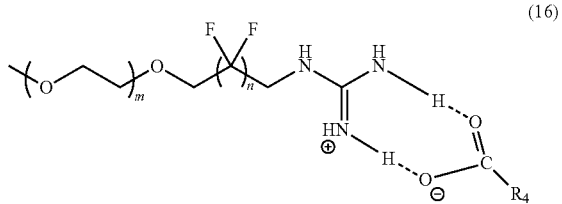

(16)

wherein:
m is an integer from 3 to 7;
n is an integer from 3 to 10;
$R_1$ is a $C_{8-30}$ hydrocarbon group, a functionalized $C_{8-30}$ hydrocarbon group such that $R_1$ is fully saturated or includes 1 to 4 carbon to carbon double bonds or 1 to 4 carbon to carbon triple bonds or combinations thereof;
$R_2$ is H, a $C_{8-30}$ hydrocarbon group, a functionalized $C_{8-30}$ hydrocarbon group such that $R_1$ is fully saturated or includes 1 to 4 carbon to carbon double bonds or 1 to 4 carbon to carbon triple bonds; and
$R_3$ and $R_4$ are each independently a $C_{8-30}$ hydrocarbon group.

In still another embodiment, a method of making a fluorinated compound is provided. The method includes a step of converting a compound having formula (18) to a compound having formula (19):

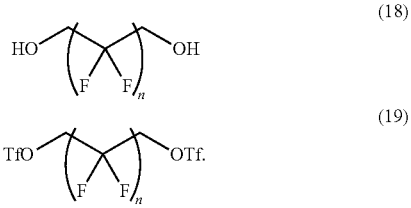

The compound having formula (18) is converted to a compound having formula 20:

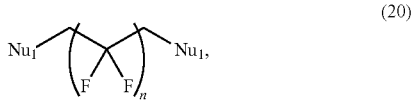

wherein is an integer from 3 to 10 and $Nu_1$ is a portion of a nucleophile that bonds to the compound having formula (18).

BRIEF DESCRIPTION OF THE DRAWINGS

Exemplary embodiments of the present invention will become more fully understood from the detailed description and the accompanying drawings, wherein.

DESCRIPTION OF THE INVENTION

Figure 1:
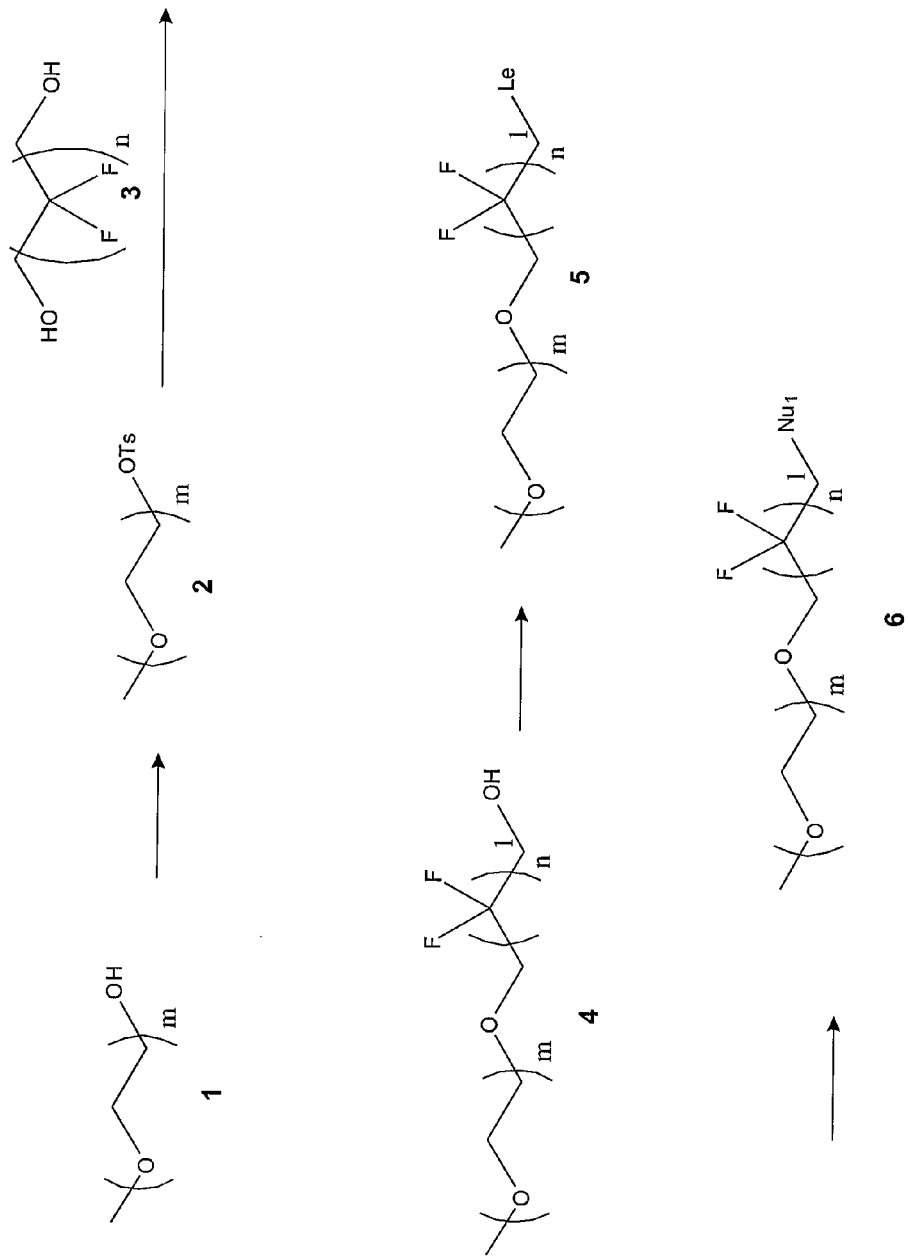
FIG. 1 provides a synthetic scheme of the synthesis of fluorinated compounds.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

ABBREVIATIONS

"TfO-" or "-OTf" stands for Trifluoromethanesulfonate;
"DMF" stands for dimethylformamide;

"DCM" stands for dichloromethane;
"TEA" stands for triethylamine;
"rt" stands for room temperature;
"Et" stands for ethyl;
"i-Pr" stands for isopropyl; and
"hrs" stands for hours.

In an embodiment of the present invention, a method for forming a fluorinated compound is provided. FIG. 1 provides a synthetic scheme of the synthesis of this embodiment and related variations. The method includes a step of converting the hydroxyl group of the compound having formula (1) to a sulfonate ester. For example, the compound having formula 1 is toslyated to form a sulfonate ester such as a compound having formula 2:

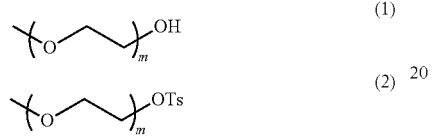

(1)

(2)

The sulfonate ester (e.g., the compound having formula (2)) is reacted with a compound having formula (3) to form a compound having formula (4) typically in the presence of a chemical base (e.g., NaH):

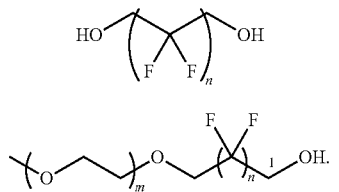

(3)

(4)

The hydroxyl group bonded to the carbon labeled "1" of the compound having formula (4) is converted to a leaving group to form the compound having formula (5):

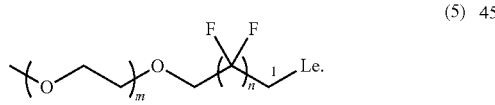

(5)

The compound with the leaving group is reacted with a nucleophile to the compound having formula (6):

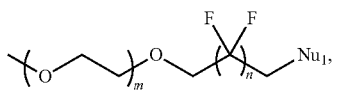

(6)

In formulae 1-6, Le is a leaving group, R is a $C_{1-6}$ alkyl, m is an integer from 3 to 7, n is an integer from 3 to 10, and $Nu_1$ is a portion of the nucleophile that bonds to the carbon atom labeled 1.

In a variation, in the step of converting the hydroxyl to a leaving group, the compound having formula (4) is reacted with trifluoromethanesulfonyl chloride to form a compound having formula (7):

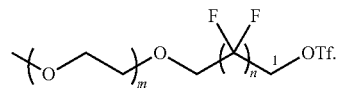

(7)

Figure 2:
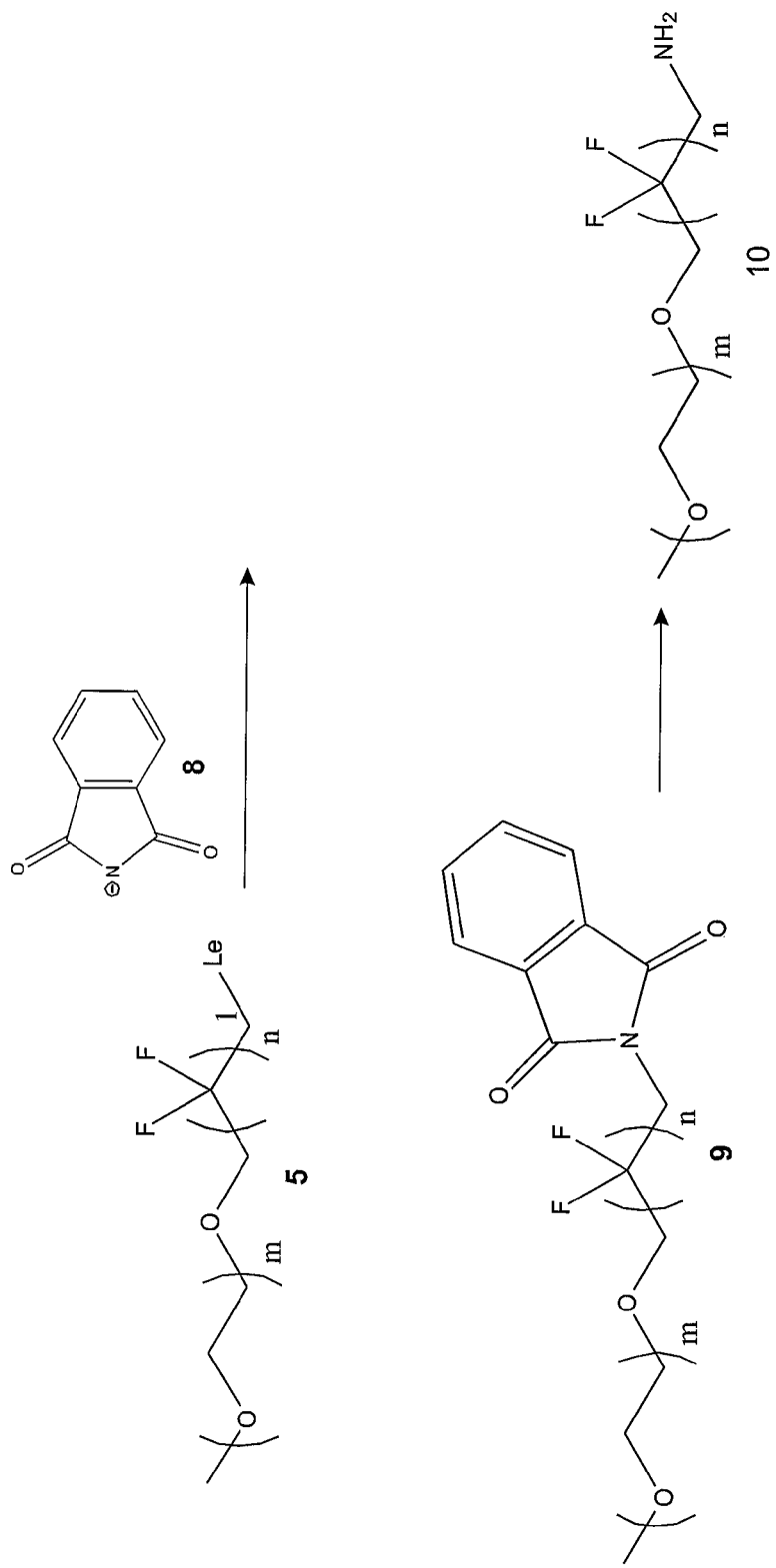
FIG. 2 provides a synthetic scheme reacting the compound having formula (5) with a nucleophile.

With reference to FIG. 2, a synthetic scheme for reacting the compound having formula (5) with a nucleophile is provided. The nucleophile that is reacted with the compound having formula (5) has the following formula (8):

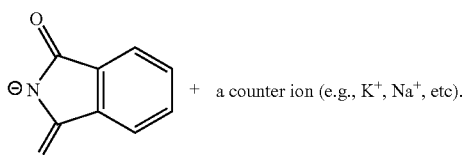

(8)

to form a compound having formula (9):

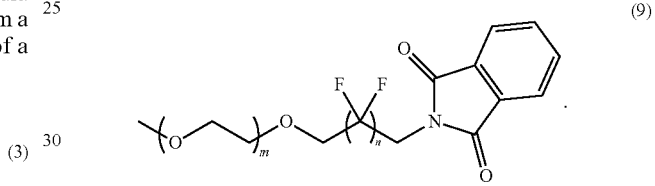

(9)

In a refinement, the compound having formula (9) is converted to a compound having formula (10):

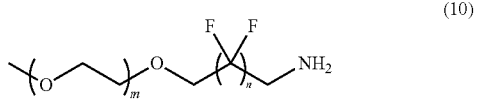

(10)

or the amine protonated derivative thereof represented by formula (10A):

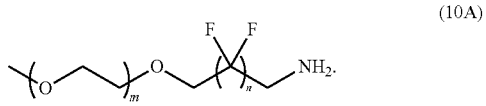

(10A)

In a refinement, the compound having formula (9) is reacted with hydrazine to form the compound having formula (10) or (10A).

Other nucleophile which may be used in the practice of the present embodiment include, but are not limited to, halide ($Cl^-$, $Br^-$, $I^-$, $F^-$), a compound having formula (11), and the like:

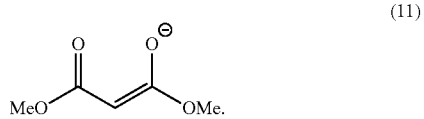

(11)

Figure 3:
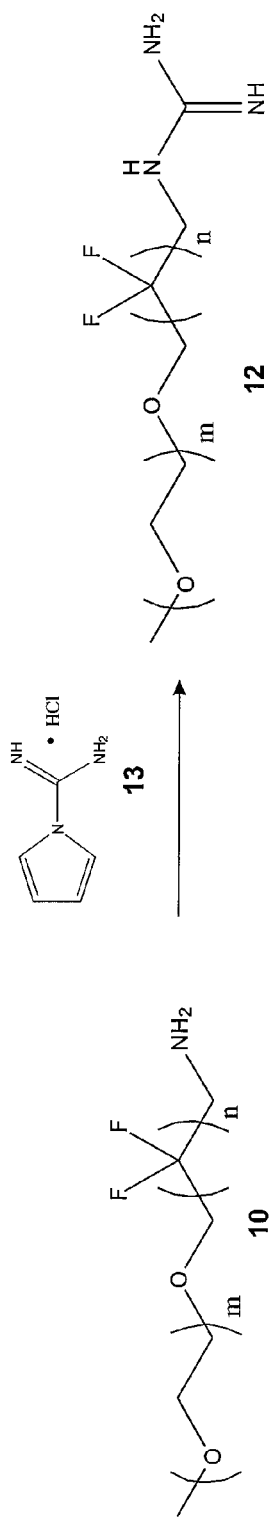
FIG. 3 provides a synthetic scheme for converting the compound having formula (10) to a compound having formula (11)

With reference to FIG. 3, the compound having formula (10) is converted to a compound having formula (12):

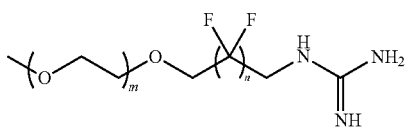

(12) or the imine protonated derivative thereof.
An example of such a conversion is to react the compound having formula (10) is reacted with a compound having formula (13) to form the compound having formula (12):

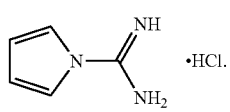

Figure 4:
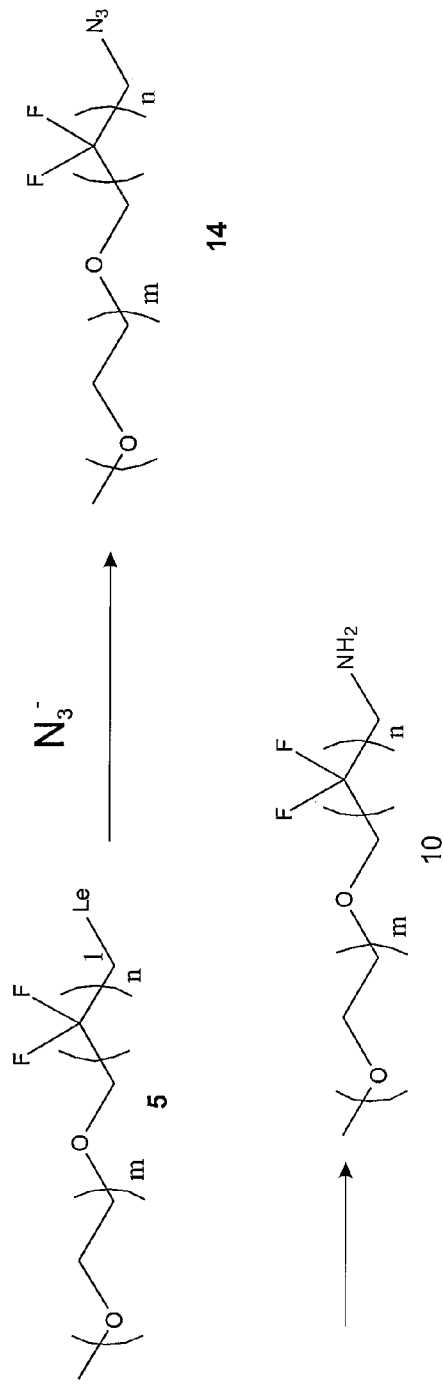
FIG. 4 provides a synthetic scheme in which the compound having formula (5) is reacted with $N_3^-$.

With reference to FIG. 4, the compound having formula (5) is reacted with $N_3^-$ (i.e., an azide salt) to form a compound having formula (14):

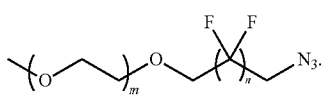

The compound having formula (14) is then converted to the compound having formula (10). As depicted in FIG. 4, the compound having formula (10) is converted to a compound having formula (12).

Figure 5:
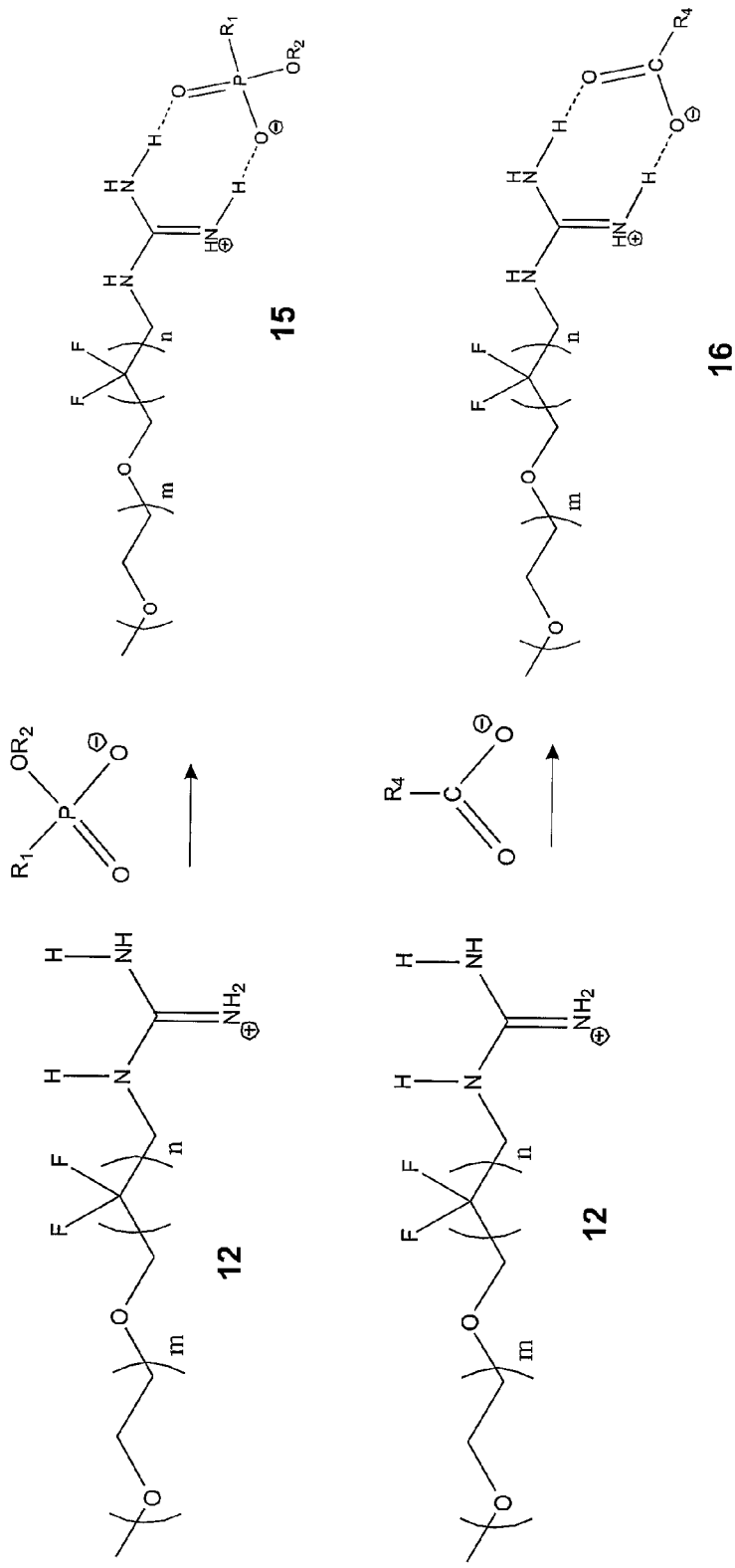
FIG. 5 provides a synthetic scheme for forming complexes (15) and (16)

With reference to FIG. 5, the compound having formula (12) is reacted with a compound having $-PO_3OR_2^-$ (phosphonate) or $-CO_2^-$ (carboxylate) groups to form a complex having formula (15) or (16) respectively:

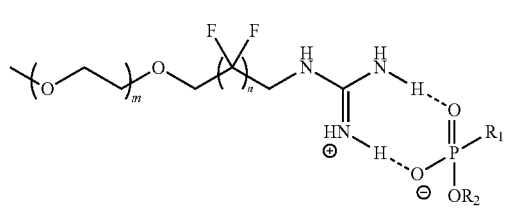

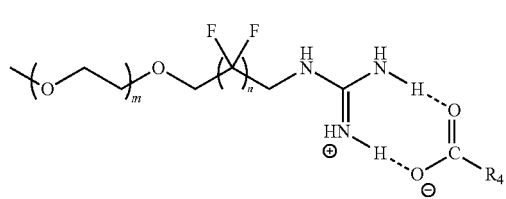

wherein m is an integer from 3 to 7; n is an integer from 3 to 10; $R_1$ is a $C_{8-30}$ hydrocarbon group, a functionalized $C_{8-30}$ hydrocarbon group such that $R_1$ is fully saturated or includes 1 to 4 carbon to carbon double bonds (i.e., an alkenyl group) or 1 to 4 carbon to carbon triple bonds (an alkynyl group) or combinations thereof and $R_2$ is H, a $C_{8-30}$ hydrocarbon group, a functionalized $C_{8-30}$ hydrocarbon group such that $R_1$ is fully saturated or includes 1 to 4 carbon to carbon double bonds or 1 to 4 carbon to carbon triple bonds. In a refinement, $R_1$ and $R_2$ include 1 to 8 herteroatoms such as S, O, or N. Examples of functional groups are groups including —SH which allows bonding to metals such as gold. Examples of $R_1$ include the moieties having formula (17A) and (17A):

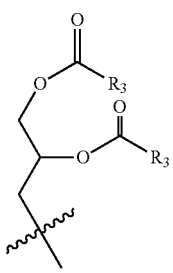

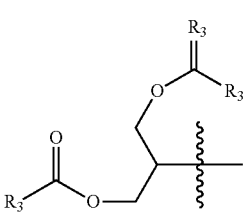

where the squiggly line intersecting the line represents the point of attachment of this group, $R_3$ and $R_4$ are each independently a $C_{8-30}$ hydrocarbon group. In a refinement, $R_3$ and $R_4$ are each independently a $C_{8-30}$ alkyl group. In a further refinement, and $R_4$ are each independently a $C_{8-30}$ alkylene group having 1 to 4 carbon to carbon double bonds or a $C_{8-30}$ alkynyl group having 1 to 4 carbon to carbon triple bonds. It should be appreciated that $R_1$ which include hydrophobic domains.

In a particular variation, the complex having formula (15) or (16) is part of a nanoparticle. Details of such nanoparticles as provided in PCT patent application no. PCT/US10/62104 filed Feb. 11, 2011; the entire disclosure of which is hereby incorporated by reference. In a refinement, the complex having formulae (15) or (16) is functionalized (e.g., with a —SH) to be bonded to a metal such as gold. In this variation, complex having formulae (15) or (16) act as a hydrophobic shell in the nanoparticles. In another refinement, the nanoparticle includes a paramagnetic atom such as gadolinium(III) metal. Nanoparticles that include paramagnetic metals are useful for magnetic resonance imaging (MRI). Such paramagnetic metals enable rapid relaxation of the spins in hydrogen atoms in a coordinated water molecules. This makes the water molecules in the proximity of the metal appear more brilliantly in the MRI image. The relaxation property is transferred to neighboring water molecules by ligand exchange ($H_2O$ for $H_2O$) and proton transfer from coordinated water to bulk solvent. This contact effect can be attenuated if the metal can be protected from interacting with its surrounding aqueous environment. In the present variation, the complex having formulae (15) or (16) will isolate the paramagnetic atom from surrounding water via the hydrophobic component of the compound having formula (11). In a typical MRI application, the nanoparticle is introduced into a subject; separating the complex having formula (11) to expose the $PO_3H^-$ groups; and imaging the paramagnetic atom by magnetic resonance imaging.

In another embodiment, a method of forming a complex is provided. The method includes a step in which a compound having formula (10) in which a compound having —PO$_2$OH$^-$ or —CO$_2^-$ groups to form a complex having formula (15) or (16) respectively:

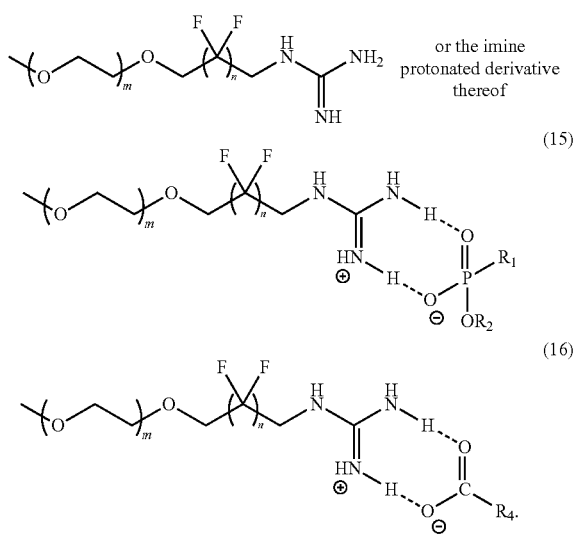

In a refinement, the complex having formula (15) or (16) is part of a nanoparticle which may include a paramagnetic atom such as gadolinium(III). Such a nanoparticle is useful for magnetic resonance imaging (MRI). In a typical MRI application, the nanoparticle is introduced into a subject; separating the complex having formula (11) to expose the PO$_3$H$^-$ groups; and imaging the paramagnetic atom by magnetic resonance imaging.

In another embodiment, a complex having formula (15) is provided:

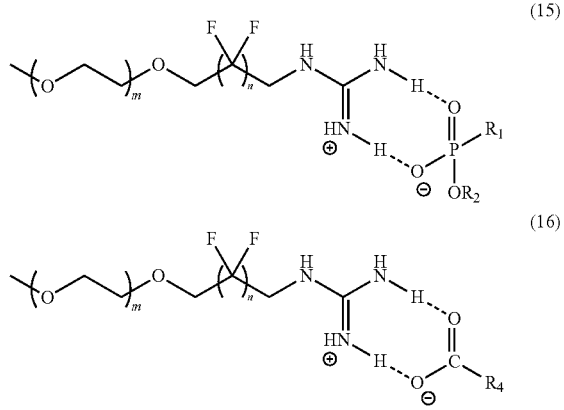

wherein
m is an integer from 3 to 7; and
n is an integer from 3 to 10.

Figure 6:
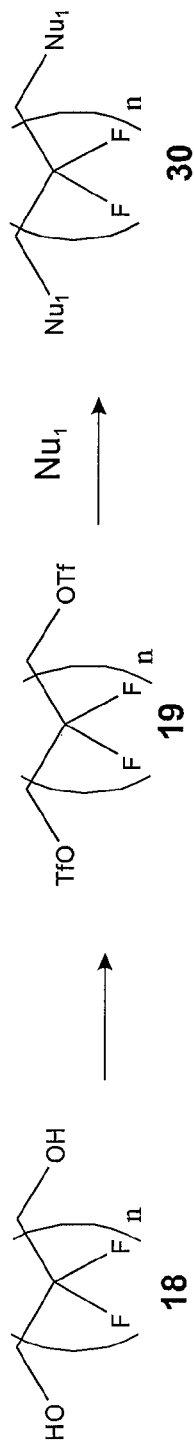
FIG. 6 provides a synthetic scheme for bi-directional functionalization of fluorinated diols.

With reference to FIG. 6, another embodiment of making a fluorinated compound is provided. The method includes a step of converting a compound having formula (18) to a compound having formula (19):

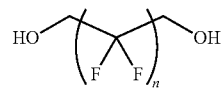

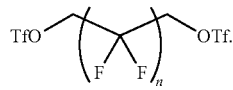

The compound having formula (19) is then converted to a compound having formula 20:

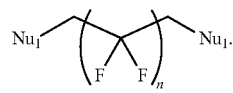

In formula 16-17, n is an integer from 3 to 10, and Nu$_1$ is a portion of the nucleophile that bonds to the compound having formula (18). Example of suitable nucleophiles include, but are not limited to halide (e.g., Cl—, Br—, F—, I— with a suitable counter ion such as K$^+$, Na$^+$ etc),

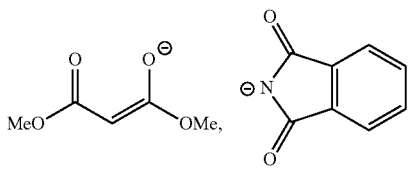 [SMILES: COC(=O)/C=C(\[O-])OC ; O=C1[N-]C(=O)c2ccccc21]

N$_3^-$, and the like. Each of these anions are associated with a suitable counter ion such as K$^+$, Na$^+$ etc.

The following examples illustrate the various embodiments of the present invention. Those skilled in the art will recognize many variations that are within the spirit of the present invention and scope of the claims.

Figure 8A:
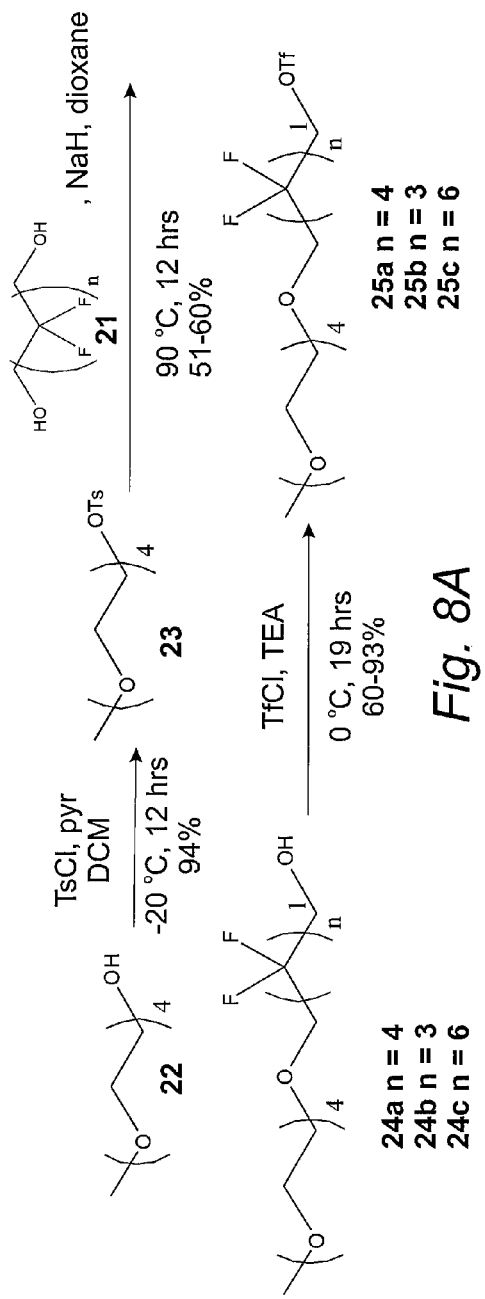
FIGS. 8A-B provide a synthetic scheme for making fluorous amphiphiles.
Figure 8B:
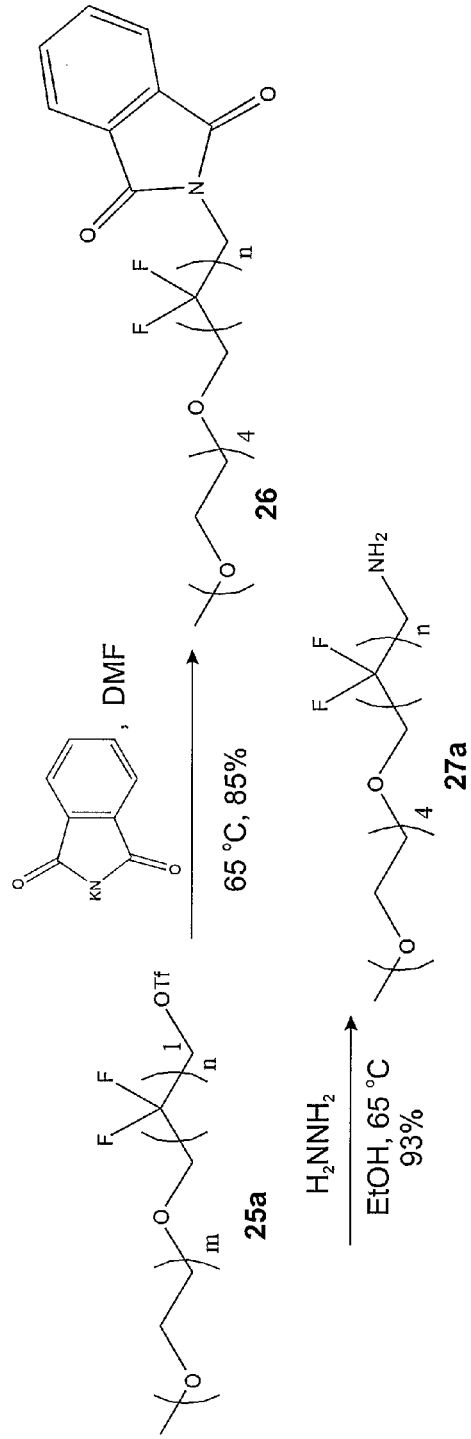
Figure 9:
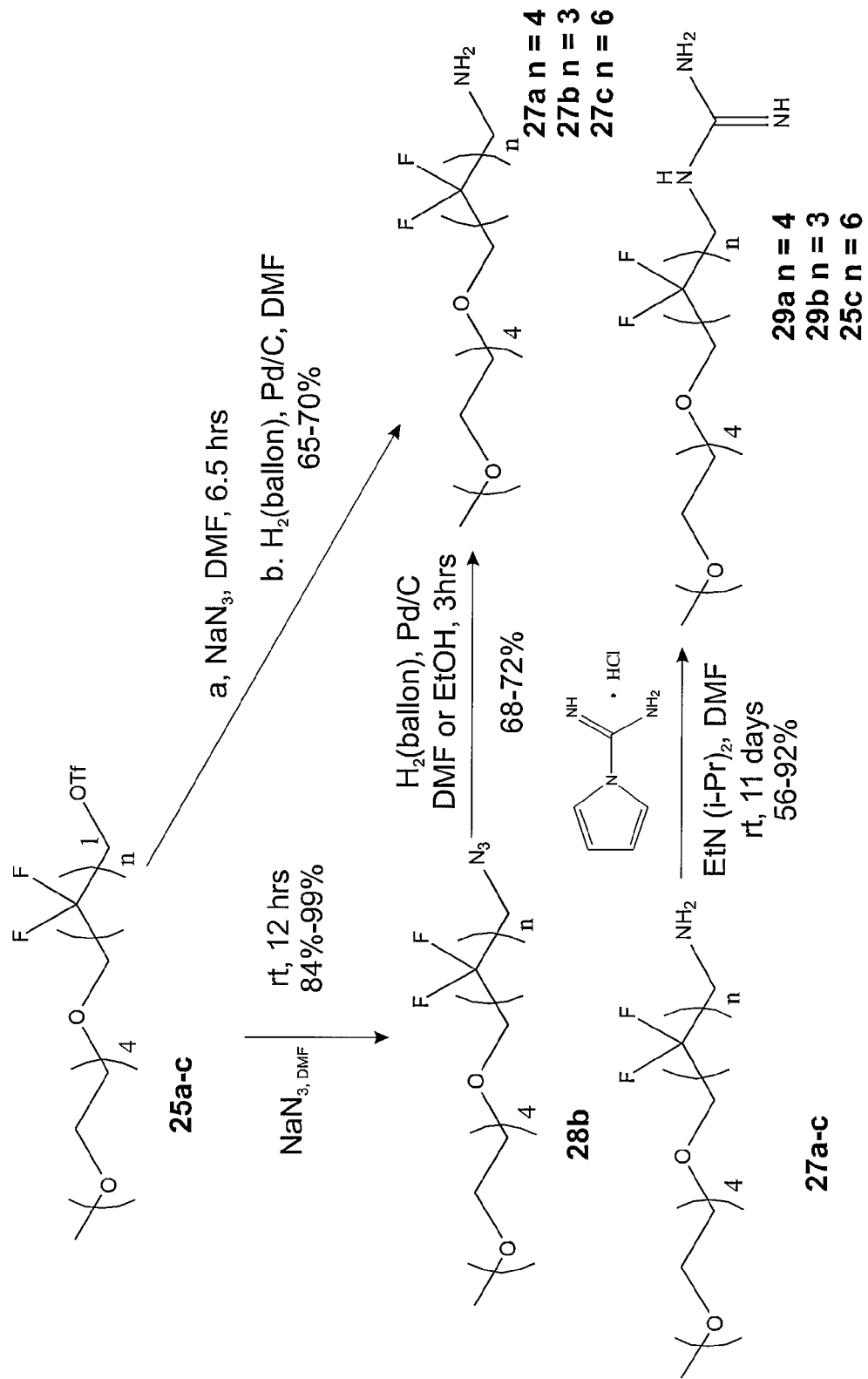
FIG. 9 provides a synthetic scheme for making fluorous amphiphiles.

Fluorous amphiphiles are constructed by attaching a fluorous diol, such as compound (21), to a poly(ethylene glycol) (PEG) fragment. A general outline of this operation is shown in the synthetic scheme of FIGS. 8A-B and 9. Accordingly, a tosylate-functionalized PEG fragment (21) is used to effect selective mono-alkylation of compound (21) in the presence of sodium hydride. The resulting PEG-functionalized fluorous alcohol can be further elaborated. A triflate is installed to mediate further functionalization, although several sulfonate esters are known to transfer polyfluoroalkyl groups. We presumed that the added reactivity of the triflate would be important to effect efficient displacement reactions. Sulfonation of fluorous alcohols is often carried out in dichloromethane, yet sulfonation of compound (25a) in dichloromethane was relatively slow. A simple change of solvent to tetrahydrofuran accelerated the rate of the reaction, affording triflate (25a) in excellent yield. C—N bond formation can be affected by triflate displacement with either (i) potassium phthalimide or (ii) sodium azide. Hydrogenation of the azide was more convenient in our hands.

Guanylation of amines (27a-c) is challenging because the proximal fluorine atoms reduce the nucleophilicity of the precursor amine. Nonetheless, successful guanylation is realized with an excess of guanylpyrazole and Hünig's base. 1H-pyrazole-1-carboximidamide is selected due to its mild guanylation conditions and ease of use. Remarkably, these guanylation reactions proceed to completion despite the attenuated nucleophilicity of the fluoroalkyl amines. This route can be generalized to generate homologs of compound (29a) featuring different lengths of the fluorocarbon (Table 1, entries 16-18).

TABLE 1

Synthesis Fluorinated Amphiphiles.

| Entry | Starting Material | Product | | Conditions | Yield |
|---|---|---|---|---|---|
| 1 | 22 | (structure with OTs) | 23 | TsCl, pyridine, DCM, −20° C. | 94% |
| 2 | 21a | (structure with OH, n=4) | 24a | NaH, dioxane, 90° C. | 62% |
| 3 | 21b | (structure with OH, n=3) | 24b | NaH, dioxane, 90° C. | 51% |
| 4 | 21c | (structure with OH, n=6) | 24c | NaH, dioxane, 90° C. | 60% |
| 5 | 24a | (structure with OTf, n=4) | 25a | TfCl, THF, 0° C.-rt, | 81%[a] |
| 6 | 24b | (structure with OTf, n=3) | 25b | TfCl, THF, 0° C.-rt, | 60% |
| 7 | 24c | (structure with OTf, n=6) | 25c | TfCl, THF, 0° C.-rt, | 93%[b] |
| 8 | 25a | (phthalimide structure) | 26 | KN(phthal), DMF, 85° C. | 84% |
| 9 | 25a | (structure with N₃, n=4) | 28a | NaN₃, DMF, rt | 84% |
| 10 | 25b | (structure with N₃, n=3) | 28b | NaN₃, DMF, rt | >99% |
| 11 | 25c | (structure with N₃, n=6) | 28c | NaN₃, DMF, rt | 87% |
| 12 | 26 | (structure with NH₂, n=4) | 27a | H₂NNH₂, EtOH, 65° C. | 93% |
| 13 | 25a | (structure with NH₂, n=4) | 27a | a. NaN₃, DMF, b. H₂ (balloon), Pd/C, rt | 70% |

TABLE 1-continued

Synthesis Fluorinated Amphiphiles.

| Entry | Starting Material | Product | | Conditions | Yield |
|---|---|---|---|---|---|
| 14 | 26b | [structure: tBuO-(CH$_2$CH$_2$O)$_4$-CH$_2$-CF$_2$-(CF$_2$)$_3$-NH$_2$] | 27b | H$_2$ (balloon), Pd/C, rt | 72% |
| 15 | 25c | [structure: tBuO-(CH$_2$CH$_2$O)$_4$-CH$_2$-CF$_2$-(CF$_2$)$_6$-NH$_2$] | 27c | a. NaN$_3$, DMF, b. H$_2$ (balloon), Pd/C, rt | 65% |
| 16 | 27a | [structure: tBuO-(CH$_2$CH$_2$O)$_4$-CH$_2$-CF$_2$-(CF$_2$)$_4$-NH-C(=NH)-NH$_2$·TFA] | 29a | [pyrazole-C(=NH)-NH$_2$·HCl]; EtN(i-Pr)$_2$, DMF, rt | 92% |
| 17 | 27b | [structure: tBuO-(CH$_2$CH$_2$O)$_4$-CH$_2$-CF$_2$-(CF$_2$)$_3$-NH-C(=NH)-NH$_2$·TFA] | 29b | [pyrazole-C(=NH)-NH$_2$·HCl]; EtN(i-Pr)$_2$, DMF, rt | 57% |
| 18 | 27c | [structure: tBuO-(CH$_2$CH$_2$O)$_4$-CH$_2$-CF$_2$-(CF$_2$)$_6$-NH-C(=NH)-NH$_2$·TFA] | 29c | [pyrazole-C(=NH)-NH$_2$·HCl]; EtN(i-Pr)$_2$, DMF, rt | 56% |

$^{a,b}$95% conversion.

3. Binding of Fluorinated Amphiphiles to a Phosphonic Acid.

Figure 10:
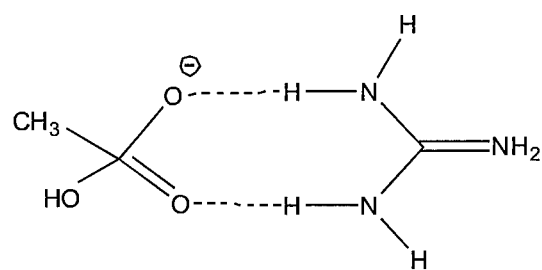
FIG. 10 depicts the binding of guanidinium to phophonate and depicts a urea complexed to a phosphonate.
Figure 10:
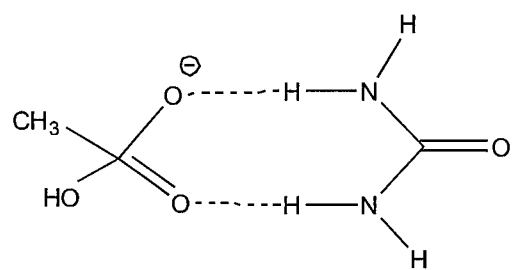
Figure 11A:
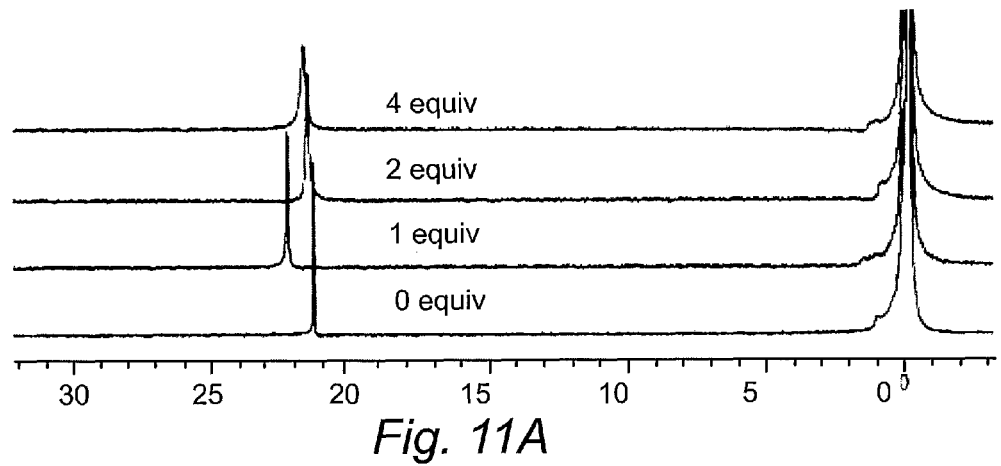
FIGS. 11A-D provide $^{31}P$ NMR plots showing the interaction between an amphiphile and $MePO_3K_2$.
Figure 11B:
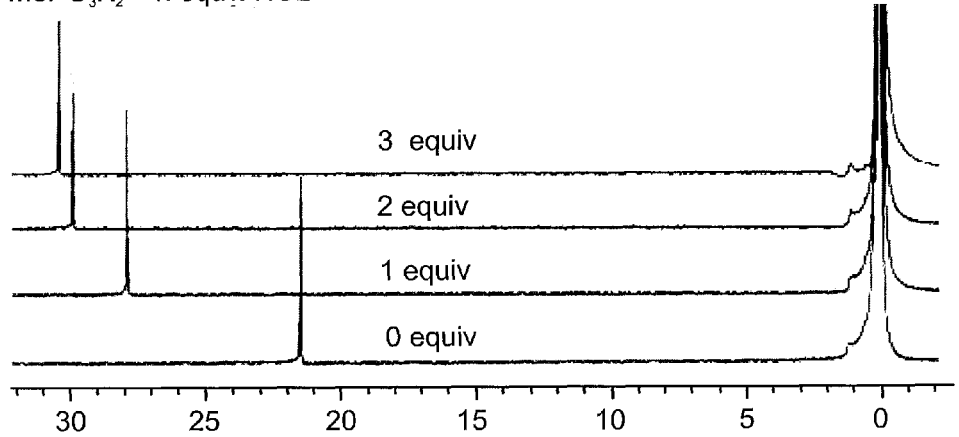
Figure 11C:
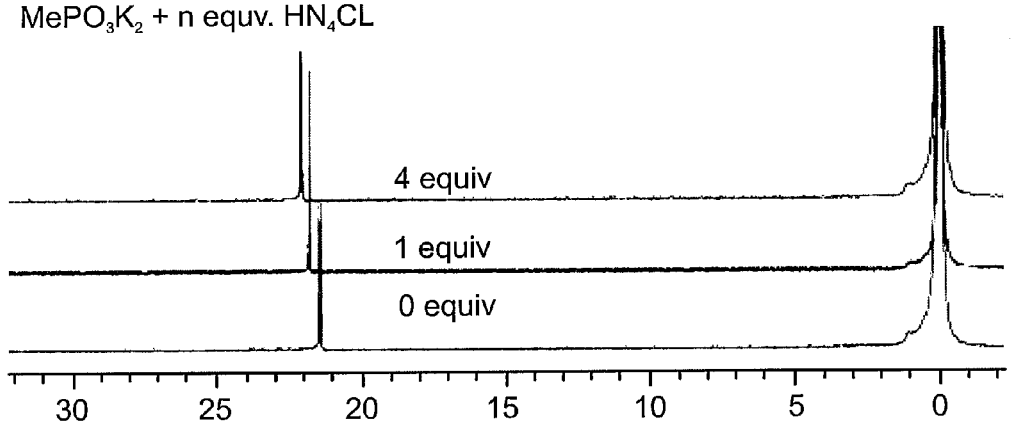
Figure 11D:
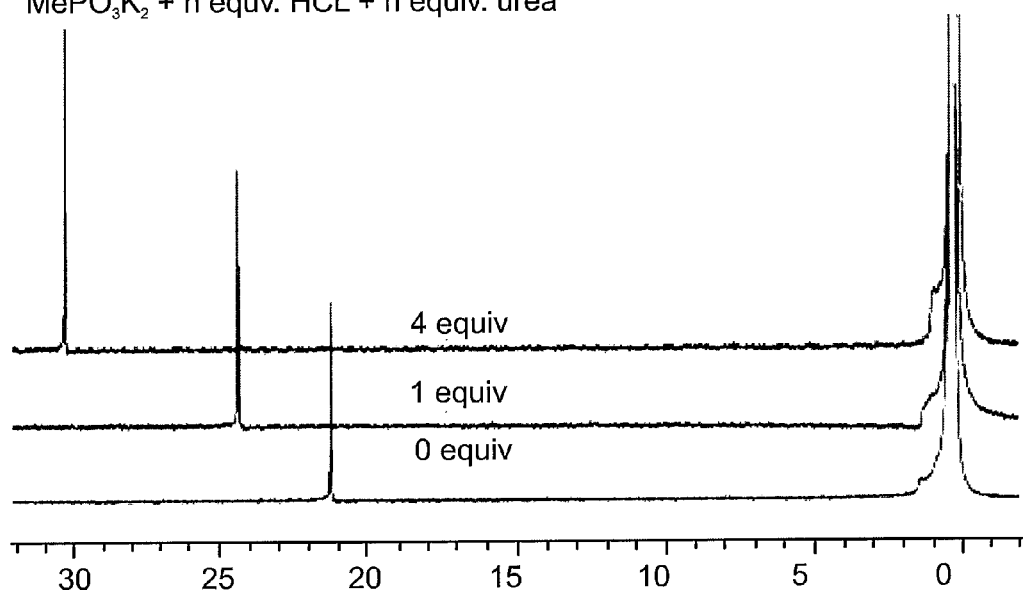

Guanidinium binds to phosphonate through a salt bridge that is buttressed by a bidentate hydrogen bonding system FIG. 10. This interaction is generally stable within a wide range of pH values. Thus, guanidinium-functionalized amphiphiles (29a-c) should form complexes with phosphonates in aqueous buffer. We show here the interaction between amphipile (29a) and MePO$_3$K$_2$ using $^{31}$P NMR, FIGS. 11A-D, which has been used as a probe for phosphate binding to several types of cations. FIG. 11A shows that as compound 29a is added to a solution of phosphonate, the $^{31}$P chemical shift of the phosphonate moves only slightly, but broadens significantly. This broadening effect is more pronounced as additional compound (29a) is added. The change in the shape of the peak is consistent with reduced tumbling associated with increased size or reversible association of compound (29a) with MePO$_3$K$_2$, which indicates complexation between the guanidinium species and the phosphonate group. By contrast, FIG. 11B shows that in the presence of HCl, a strong Brønsted acid, protonated MePO$_3$H$_2$ remains sharp and shifts downfield to 30.4 ppm. Thus, guanidinium compound (29a) is not merely protonating the phosphonate in FIG. 11A. Treatment of MePO$_3$K$_2$ with NH$_4$Cl resulted in a small downfield shift like HCl, but did not broaden the signal like compound (29a). Urea is structurally similar to guanidinium and can potentially complex a phosphonate in a manner similar to compound (29a) (FIG. 10). In the presence of HCl, similar chemical behavior is expected when MePO$_3$K$_2$ is treated with urea as when it is treated with compound 29. Interestingly, these peaks do not broaden as is observed with the apparent MePO$_3$K$_2$-9a complex (FIG. 11D). Overall, these spectra show that complexes depicted in FIG. 10 methylphosphonate as indicated by NMR properties which different from those of the corresponding free phosphonate, phosphonic acid, or a putative urea-phosphonate complex.

TABLE 2

NMR Evidence for Guanidinium-Phosphate Binding.

| Spectrum | Content | Chemical shift (ppm) | Half-Height Width (Hz) |
|---|---|---|---|
| A, 4 equiv | MePO$_3$K$_2$ + 4 eq 9a | 21.6 | 35.5 |
| A, 2 equiv | MePO$_3$K$_2$ + 2 eq 9a | 21.6 | 20.0 |
| A, 1 equiv | MePO$_3$K$_2$ + 1 eq 9a | 22.4 | 11.2 |
| A, 0 equiv | MePO$_3$K$_2$ | 21.4 | 4.2 |
| B, 3 equiv | MePO$_3$K$_2$ + 3 eq HCl | 30.4 | 3.4 |
| B, 2 equiv | MePO$_3$K$_2$ + 2 eq HCl | 29.9 | 3.4 |
| B, 1 equiv | MePO$_3$K$_2$ + 1 eq HCl | 27.8 | 3.8 |
| B, 4 equiv | MePO$_3$K$_2$ | 21.4 | 4.2 |
| C, 1 equiv | MePO$_3$K$_2$ + 4 eq. NH$_4$Cl | 22.1 | 4.2 |
| C, 0 equiv | MePO$_3$K$_2$ + 1 eq NH$_4$Cl | 21.8 | 3.6 |
| C, 0 equiv | MePO$_3$K$_2$ | 21.4 | 4.2 |
| D, 4 equiv | MePO$_3$K$_2$ + 4 eq urea + 2 eq HCl | 27.7 | 3.6 |
| D, 1 equiv | MePO$_3$K$_2$ + 1 eq urea + 2 eq HCl | 27.6 | 3.3 |
| D, 0 equiv | MePO$_3$K$_2$ | 21.4 | 4.2 |

4. Bi-Directional Functionalization of Fluorinated Diols

The methods developed above for the synthesis of fluorinated amphiphiles also have utility in bidirectional applications. Our general route to doubly functionalized fluorinated materials is sketched in Table 3. Thus, treatment of diols such as compound 21 with trifluoromethanesulfonyl chloride gives easy access to bis(sulfonic) esters 30, which are remarkably stable and easily manipulated building blocks. Entries 1-5 of Table 3 illustrate conditions for the double displacement of triflate 30. Since dehydrofluorination is *facile* in many fluorous compounds in the presence of stronger bases, only weakly basic nucleophiles were used here. For example, bromide can displace the triflate easily to give compound 31a in 81% yield. Treatment of compound 30 with potassium malonate results in selective cyclization to give octa(fluoro) cycloheptane 31b. While fluorocarbon chains are known to be more rigid than their hydrocarbon counterparts, the formation of this seven-membered ring indicates that the octafluoro-precursor is reasonably flexible. We found C—N bond formation with compound 30 to proceed smoothly under multiple conditions: both phthalimide and azide react with compound 30 to generate the respective intermediates 31c and 31d in high yield (entries 3 and 4). Compound 31d forms with less apparent degradation of the fluorocarbon group. Installation of an intermediate triflate in the synthesis of compound 31 d seems essential: attempts to obtain compound 31d directly using diphenylphosphoryl azide left diol 21 unreacted. Direct hydrogenation of compound 31d using Pd/C led to extensive degradation while little or no product was formed. By contrast, using the Lindlar catalyst afforded 32 with satisfying yield in the presence of quinoline (entry 7). Compound 31 d participates in double Hüisgen cycloaddition under traditional conditions in high yield (entry 8).

TABLE 3

Figure 7:
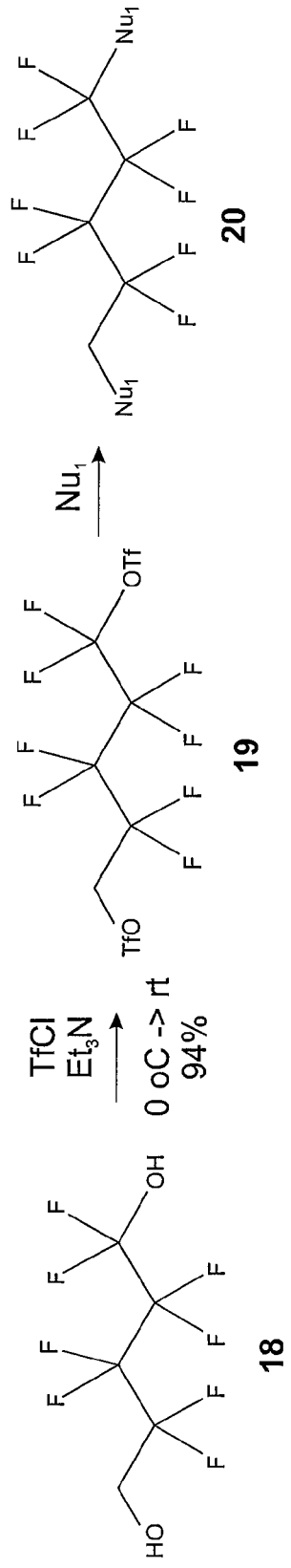
FIG. 7 provides a synthetic scheme for fluorinated bis (sulfonic) Ester 30.

Synthesis and Derivatization of Fluorinated Bis(sulfonic) Ester 30. (See FIG. 7)

| Entry | Starting Material | Nucleophile or reagent | Conditions | Product | Yield[a] |
|---|---|---|---|---|---|
| 1 | 30 | KBr | DMF, 8-Crown-6, rt | 31a | 81% |
| 2 | 30 | MeO-C(=O)-CH=C(OK)-OMe | DMF, rt | 31b | 57% |
| 3 | 30 | potassium phthalimide | DMF, 85° C. | 31c | 89% |
| 4 | 30 | NaN$_3$ | DMF, rt | 31d | >99% |
| 5 | 31c | H$_2$NNH$_2$ | EtOH, 65° C. | 32 | 76% |
| 6 | 31d | H$_2$ | H$_2$ (balloon), EtOH, Lindlar, rt | 32 | 13% |
| 7 | 31d | H$_2$ | H$_2$ (balloon), EtOH, Lindlar, quinoline, rt | 32 | 59% |
| 8 | 31d | Ph—≡—H | DMF, CuI, 70° C. | 33 | 85% |

[a]All yields are isolated yields.

SUMMARY

Triflate esters, which are easily prepared from the corresponding commercially available diols, are effective building blocks for nitrogen substituted fluorous-phase amphiphiles that are not easily prepared through other methods. These reactions are high yielding, operationally simple, and afford easy access to highly fluorinated materials. Among these compounds, guanidine-terminated amphiphiles have special value because they present an interesting approach to binding phosphate-covered molecules or materials in aqueous solution. Ongoing research in our laboratories involves the application of these materials to the control of nanoparticle solubility and self-assembly.

General Procedures: All water sensitive procedures were carried out using standard Schlenk techniques under nitrogen when indicated. All reagents were purchased from Alfa Aesar or TCI and used without further purification. Dry solvents were obtained from EMD. All other solvents were reagent grade and used as received. Distilled water was purchased from Arrowhead.

Deuterated NMR solvents were purchased from Cambridge Isotopes Labs. Chloroform-d ($CDCl_3$) was used as received; NMR spectra were obtained on a Varian Mercury 400, Varian VNMRS 500, or Varian VNMRS 600 MHz spectrometer. All chemical shifts are reported in units of ppm and referenced to the residual $^1H$ solvent. Data are reported as follows: chemical shift (ppm); multiplicity (s: singlet, d: doublet, t: triplet, q: quartet, h: heptet, m: multiplet, br: broad, tm: triplet of multiplet, tq: triplet of quintet); integration; coupling constants (Hz); assignment. $^{13}C$ NMR spectra were referenced to the solvent chemical shift at 77.0 ppm for $CDCl_3$. $^{19}F$ NMR spectra were referenced to $CFCl_3$ as an external standard at 0.0 ppm. All NMR spectra were taken at 25° C. unless otherwise indicated.

Mass spectra were obtained by electrospray ionization (ESI). MALDI mass spectra were obtained on an Applied Biosystems Voyager spectrometer using the evaporated drop method on a coated 96 well plate. The 2,5-dihydroxybenzoic acid from Aldrich was used as a matrix. In a standard preparation, ca. 1 mg of analyte and ca. 20 mg of matrix were dissolved in a 1 mL of suitable solvent and spotted on the plate with a micropipette.

PEG Tosylate 23

To a solution of tetraethyleneglycol monomethyl ether (22) (10.0 g, 48.0 mmol) and pyridine (84 mL) in $CH_2Cl_2$ (DCM) (170 mL), solid p-toluenesulfonyl chloride (22.0 g, 115.4 mmol) was added portion-wise at −20° C. under nitrogen. The resulting reaction mixture was stirred for 2 days at −20° C. Then, the reaction mixture was allowed to warm to room temperature and water (200 mL) was added. The aqueous layer was extracted with $CH_2Cl_2$ (150 mL×3). The combined organic fractions were dried over $MgSO_4$ and the solvent was removed under reduced pressure. The crude product was purified by chromatography on silica (1:1 EtOAc:hexanes; $R_f$=0.3) to yield compound 23 as a colorless oil, 16.4 g, 94%. $^1H$ NMR (500 MHz, CDCl3): δ=7.80 (d, Ar, 2H), 7.34 (d, Ar, 2H), 4.16 (t, 2H), 3.66 (t, 2H), 3.62-3.65 (m, 6H), 3.58 (s, 4H), 3.532-3.56 (m, 2H), 3.34 (s, 3H), 2.43 (s, 3H). $^{13}C$ NMR (125 MHz, $CDCl_3$): δ=144.71 (s, $CSO_2O$), 132.94 (s, $CH_3CCH$), 129.74 (s, $CHCHCSO_2$), 127.89 (s, CCHCH), 71.79, 70.57, 70.46, 70.44, 70.38, 70.36, 69.20, 68.52, 58.94 ($CH_3OCH_2$), 21.56 ($CH_3CHCH$). This data is consistent with a previously reported compound.

PEG-Fluorinated Alcohol 24a

To a solution of diol 21 (10.85 g, 41.4 mmol) in dry dioxane (236 mL), NaH powder (0.563 g, 23.46 mmol) was added under nitrogen and stirred for 30 min at room temperature. The reaction flask was then placed in 90° C. oil bath and continued to stir for 2 hours. A solution of compound 23 (5 g, 13.8 mmol) in dry dioxane (20 ml) was then added drop wise. The mixture stirred overnight. Then the reaction was cooled down and quenched by hydrochloric acid (2 M in diethyl ether, 4.33 mL), and the solvent was removed under reduced pressure. The crude compound was dissolved in dichloromethane (200 mL) and a white precipitate was removed via filtration. After solvent removal, the crude product was purified by flash chromatography (1:2 ethyl acetate:hexanes, $R_f$=0.5) to yield the monosubstituted product as a clear oil, 3.86 g, 62%. $^1H$ NMR (400 MHz, $CDCl_3$): δ=4.09-3.96 (m, 4H, $OCH_2(CF_2)_4CH_2OH$), 3.78-3.74 (m, 2H), 3.67-3.61 (m, 12H), 3.55-3.52 (m, 2H), 3.36 (s, 3H, $OCH_3$), 3.12 (t, $^3J_{F,F}$=7.2 Hz, 1H, $CH_2OH$). $^{13}C$ NMR (125 MHz, $CDCl_3$): δ=118.08-109.06 (m, $CF_2$), 72.37, 72.00, 70.80, 70.77, 70.67, 70.63, 70.53, 68.3 (t, $^2J_{C,F}$=24.9 Hz, $CF_2CH_2OCH_2$), 60.59 (t, $^2J_{C,F}$=25.4 Hz, $CF_2CH_2OH$), 59.07 (s, $CH_3O$). $^{19}F$ NMR (376 MHz, CDCl3): δ=(−124.1)-(−124.1) (m, 4F), −123.0 (p, $^3J_{F,F}$=214.8 Hz, 2F), −120.4 (p, $^3J_{F,F}$=13.3 Hz, 2F). FT-IR ($cm^{-1}$, neat): v=3415, 2882, 1457, 1351, 1177-1119, 946, 865, 762. MALDI-TOF for $C_{15}H_{24}F_8O_6$ $[MNa]^+$: calculated 475.13 g/mol. found 475.10 g/mol.

PEG-Fluorinated Alcohol 24b, 24c

Compounds 24b and 24c were prepared in the same way as compound 24a with 51% and 60% yield, respectively. Compound 24b. $^1H$ NMR (400 MHz, $CDCl_3$): δ=4.07 (td, $^3J_{H,F}$=15.32 Hz, $^3J_{H,H}$=7.3, 4H, $HOCH_2(CF_2)_3$), 4.00 (t, $^3J_{H,F}$=14.3 Hz, 4H, $HOCH_2(CF_2)_3CH_2$), 3.77-3.76 (m, 2H), 3.68-3.63 (m, 12H), 3.56-3.54 (m, 2H), 3.38 (s, 3H, $OCH_3$), 2.91 (t, $^3J_{H,H}$=7.3 Hz, 1H, $CH_2OH$). $^{13}C$ NMR (126 MHz, $CDCl_3$): δ=118.19-109.41 (m, $(CF_2)_3$), 72.06, 71.94, 70.66-70.48 (($OCH_2CH_2O)_4$), 68.20 (t, $^2J_{C,F}$=25.4 Hz, $CF_2CH_2OCH_2$), 60.31 (t, $^2J_{C,F}$=25.4 Hz, $CF_2CH_2OH$), 59.01 (s, $CH_3O$). $^{19}F$ NMR (376 MHz, CDCl3): δ=−120.46 (m, 2F), −123.05 (m, 2F), −127.47 (m, 2F). FT-IR ($cm^{-1}$, neat): v=3421, 2881, 1460, 1350, 1285-1307, 937, 886, 850, 771, 668. MALDI-TOF for $C_{14}H_{24}F_6O_6$ $[MNa]^+$: 425.14 g/mol, found 425.03 g/mol. Compound 24c. $^1H$ NMR (400 MHz, $CDCl_3$): δ=4.09 (td, $^3J_{H,F}$=14.3 Hz, $^3J_{H,H}$=7.6, 4H, $HOCH_2(CF_2)_6$), 4.04 (t, $^3J_{H,F}$=14.2 Hz, 4H, $HOCH_2(CF_2)_6CH_2$), 3.79-3.77 (m, 2H), 3.69-3.63 (m, 12H), 3.56-3.54 (m, 2H), 3.38 (s, 3H, $OCH_3$), 2.19 (t, $^3J_{H,H}$=7.6 Hz, 1H, $CH_2OH$). $^{13}C$ NMR (126 MHz, $CDCl_3$): δ=117.82-108.76 (m, $(CF_2)_3$), 72.41, 72.00, 70.82-70.56 (($OCH_2CH_2O)_4$), 68.44 (t, $^2J_{C,F}$=24.4 Hz, $CF_2CH_2OCH_2$), 60.60 (t, $^2J_{C,F}$=25.4 Hz, $CF_2CH_2OH$), 59.08 (s, $CH_3O$). $^{19}F$ NMR (470 MHz, CDCl3): δ=−120.25 (m, 2F), −122.60 (m, 4F), −122.83 (m, 2F), −124.08 (m, 4F). FT-IR ($cm^{-1}$, neat): v=3408, 2884, 1645, 1457, 1197-1106, 944, 846, 758-726. MALDI-TOF for $C_{17}H_{24}F_{12}O_6$ $[MNa]^+$: 575.13 g/mol, found 575.08 g/mol.

PEG-Fluorinated Triflate 25a

To a solution of compound 24a (1 g, 2.21 mmol) in dry THF (3.3 mL), triethylamine (0.68 ml, 4.862 mmol) was added under $N_2$ atmosphere. The mixture was stirred for 10 min, after which the flask was cooled to 0° C. Trifluoromethanesulfonyl chloride (0.47 ml, 4.42 mmol) was then added and the reaction mixture was stirred for 14 hours. The solvent was removed under reduced pressure. The crude product was dissolved in ether and filtered to remove a white solid. The solvent of the filtrate was removed under reduced pressure. The crude product was purified by flash chromatography (2:1 ethyl acetate:hexanes, $R_f$=0.42) to give compound 25a as a clear, oily liquid (1.05 g). Yield: 81%, conversion: 95%. $^1H$ NMR (400 MHz, $CDCl_3$): δ=4.79 (t, $^3J_{H,F}$=12.6 Hz, 2H, $CF_3SO_2OCH_2CF_2$), 4.01 (t, $^3J_{H,F}$=13.9 Hz, 2H, $CH_2OCH_2$ $CF_2$), 3.77-3.73 (m, 2H), 3.66-3.59 (m, 12H), 3.53-3.50 (m, 2H), 3.35 (s, 3H, $CH_3O$). $^{13}C$ NMR (100 MHz, $CDCl_3$): δ=118.4 (q, $^1J_{C,F}$=318.9 Hz, $SO_2CF_3$), 117.89-110.77 (m, $CF_2$), 72.2, 71.8, 70.62, 70.59, 70.51, 70.49, 70.42, 68.45 (t, $^2J_{C,F}$=27.3 Hz, $CH_2OTf$), 68.16 (t, $^2J_{C,F}$=24.9 Hz, $CH_2OCH_2CF_2$), 58.9 (s, $CH_3O$). $^{19}F$ NMR (376 MHz, $CDCl_3$): δ=−124.0 (m, 4F), −120.5 (p, 2F, $^2J_{C,F}$=12.4 Hz, $OCH_2CF_2$), −120.3 (m, 2F, $CF_2CH_2OTf$), −74.6 (s, 3F, $CF_3SO_2$). FT-IR ($cm^{-1}$, neat): v=2885, 1428, 1215-1134, 1017, 958, 838, 611. MALDI-TOF for $C_{16}H_{23}F_{11}O_8S$ [MNa]$^+$: calculated 607.08 g/mol. found 606.85 g/mol.

PEG-Fluorinated Triflate 25b, 25c

Compounds 25b, 25c were prepared in a similar way as compound 25a to afford 60% yield (100% conversion) and 93% yield (95% conversion), respectively. Compound 5b: $^1H$ NMR (500 MHz, $CDCl_3$): δ=4.82 (t, $^3J_{H,F}$=13.2 Hz, 2H, $CF_3SO_2OCH_2CF_2$), 4.03 (t, $^3J_{H,F}$=14.2 Hz, 2H, $CH_2OCH_2CF_2$), 3.77-3.76 (m, 2H), 3.67-3.63 (m, 12H), 3.55-3.53 (m, 2H), 3.37 (s, 3H, $CH_3O$). $^{13}C$ NMR (126 MHz, $CDCl_3$): δ=118.57 (q, $^1J_{C,F}$=318.6 Hz, $SO_2CF_3$), 117.4-108.8 (m, $CF_2$), 72.35, 72.07, 70.83, 70.76, 70.74, 70.71, 70.65, 69.03 (t, $^2J_{C,F}$=26.4 Hz, $CH_2OTf$), 68.14 (t, $^2J_{C,F}$=26.4 Hz, $CH_2OCH_2CF_2$), 58.9 (s, $CH_3O$). $^{19}F$ NMR (470 MHz, $CDCl_3$): δ=(−123.9)-(−124.1) (m, 4F, $CF_2CF_2CH_2$), −120.5 (p, 2F, $^3J_{C,F}$=12.4 Hz, $OCH_2CF_2$), (−120.2)-(−120.35) (m, 2F, $CF_2CH_2OTf$), −74.6 (s, 3F, $CF_3SO_2$). FT-IR ($cm^{-1}$, neat): v=2878, 1427, 1216, 1144 1008, 969, 613. MALDI-TOF for $C_{15}H_{23}F_9O_8S$ [MNa]$^+$: calculated 557.09 g/mol. found 556.90 g/mol.

Compound 25c. $^1H$ NMR (500 MHz, $CDCl_3$): δ=4.80 (t, $^3J_{H,F}$=12.2 Hz, 2H, $CF_3SO_2OCH_2CF_2$), 4.02 (t, $^3J_{H,F}$=13.4 Hz, 2H, $CH_2OCH_2CF_2$), 3.77-3.75 (m, 2H), 3.66-3.60 (m, 12H), 3.53-3.51 (m, 2H), 3.35 (s, 3H, $CH_3O$). $^{13}C$ NMR (126 MHz, $CDCl_3$): δ=118.52 (q, $^1J_{C,F}$=320.7 Hz, $SO_2CF_3$), 118.03-108.41 (m, $CF_2$), 72.41, 72.02, 70.82-70.60, 68.37 (t, $^3J_{C,F}$=28.9 Hz, $CH_2OTf$), 68.13 (t, $^3J_{C,F}$=28.9 Hz, $CH_2OCH_2CF_2$), 59.0 (s, $CH_3O$). $^{19}F$ NMR (470 MHz, $CDCl_3$): δ=−120.16 (m, 4F), −122.5 (m, 2F), −122.48 (m, 2F), −123.43 (m, 2F), −74.4 (s, 3F, $CF_3SO_2$). FT-IR ($cm^{-1}$, neat): v=2884, 1427, 1203, 1142, 1012, 956, 821, 612. MALDI-TOF for $C_{18}H_{23}F_{15}O_8S$ [MNa]$^+$: calculated 707.08 g/mol. found 706.73 g/mol.

PEG-Fluorinated Phthalimide 26

Potassium phthalimide (4.12 g, 22.3 mmol) was added to a solution of compound 25a (6.5 g, 11.1 mmol) in DMF (223 mL). The reaction was stirred at 65° C. overnight under nitrogen. The reaction was then cooled to room temperature and solvent was removed under reduced pressure. Chloroform (200 mL) was added and a white precipitate was filtered. The solvent was removed under reduce pressure. The compound was then purified on a silica gel column with a solvent gradient (in 4:1 ethyl acetate:hexanes $R_f$=0.4) to yield a clear oil 5.4 g, 84%. $^1H$ NMR (400 MHz, $CDCl_3$): δ=7.92 (q, $^3J_{H,H}$=2.8 Hz, Ar, 4H), 7.78 (q, $^3J_{H,H}$=2.8 Hz, Ar, 4H), 4.35 (t, $^3J_{H,F}$=15.8 Hz, 2H, $NCH_2CF_2$), 4.03 (t, $^3J_{H,F}$=14.4 Hz, 2H, $CH_2OCH_2CF_2$), 3.80-3.75 (m, 2H), 3.69-3.61 (m, 12H), 3.56-3.51 (m, 2H), 3.36 (s, 3H, $CH_3O$). $^{13}C$ NMR (100 MHz, $CDCl_3$): δ=166.9 (s, Ar), 134.5 (s, Ar), 131.6 (s, Ar), 123.9 (s, Ar), 118.4-109.2 (m, $CF_2$), 72.3, 71.9, 70.71, 70.67, 70.64, 70.58, 70.56, 70.52, 70.48, 70.44, 68.3 (t, $^2J_{C,F}$=24.9 Hz, $CF_2CH_2OCH_2$), 58.97 (s, $CH_3O$), 37.45 (t, $^2J_{C,F}$=23.5 Hz, $CF_2CH_2N$). $^{19}F$ NMR (376 MHz, $CDCl_3$): δ=−124.13 (m, 2F), −123.73 (m, 2F,), −120.35 (m, 2F), −116.6 (m, 2F). FT-IR ($cm^{-1}$, in $CDCl_3$): v=3154, 2985, 2903, 2254, 1793, 1472, 1378, 1382, 1099, 910, 733. MALDI-TOF for $C_{23}H_{27}F_8NO_7$ [MNa]$^+$: calculated 604.1557 g/mol. found 603.8150 g/mol.

PEG-Fluorinated Amine 27a

Compound 26 (3.8 g, 6.5 mmol) was treated with hydrazine (2.05 mL, 65.2 mmol) in anhydrous ethanol (150 mL) at 65° C. and stirred overnight under nitrogen. The reaction was cooled to room temperature. White precipitate was filtered and washed with $CHCl_3$. The solvent was removed under reduced pressure. Chloroform (200 mL) was then added and stirred for 30 minutes. More white precipitate was obtained and the precipitate was filtrated and the solvent was removed to yield the product as light yellow oil, 2.74 g, 93%.

Alternative route to prepare compound 27a via a one-pot hydrogenation of azide 28a: To a solution of 25a (190 mg, 0.33 mmol) in DMF (1.5 mL), sodium azide (26.6 mg, 0.41 mmol) was added under nitrogen. The reaction mixture was stirred for 6.5 hours. Then Pd/C (2.4 mg, 10% w/w) was added and the reaction was purged under hydrogen gas. A balloon filled with hydrogen gas was attached to the reaction, which was then stirred for 3 hrs. Then the Pd/C was filtered out on a pad of Celite. The reaction mixture was poured over 1M aqueous HCl (2 mL) and, washed with ether (1.5 mL×2). The pH of the aqueous phase was adjusted to 12 with saturated NaOH solution, and extracted with ether (2 mL×3). The combined organic fractions were dried over $MgSO_4$. The solvent was removed under reduced pressure to afford compound 27a as a yellow, oily liquid (102.8 mg). Yield: 70%. Compound 27a. $^1H$ NMR (400 MHz, $CDCl_3$): δ 4.02 (t, $^3J_{H,F}$=14.3 Hz, 2H, $CH_2OCH_2CF_2$), 3.80-3.75 (m, 2H), 3.69-3.61 (m, 12H), 3.56-3.51 (m, 2H), 3.37 (s, 3H, $CH_3O$), 3.24 (t, $^3J_{H,F}$=15.8 Hz, 2H, $NCH_2CF_2$), 1.36-1.21 (br, 2H, $CF_2CH_2NH_2$). $^{13}C$ NMR (100 MHz, $CDCl_3$): δ=118.4-109.6 (m, $CF_2$), 72.3, 71.9, 70.71, 70.68, 70.65, 70.59, 70.57, 70.50, 68.3 (t, $^3J_{C,F}$=24.6 Hz, $CF_2CH_2OCH_2$), 58.99 (s, $CH_3O$), 42.92 (t, $^3J_{C,F}$=24.1 Hz, $CF_2CH_2NH_2$). $^{19}F$ NMR (376 MHz, $CDCl_3$): δ=−124.5 (m, 2F), −124.21 (m, 2F), −122.17 (m, 2F), −120.50 (m, 2F). FT-IR ($cm^{-1}$, in $CDCl_3$): v=3409, 3340, 2878, 1632, 1460, 1352, 1232-1115, 956, 858. MALDI-TOF for $C_{15}H_{25}F_8NO_5$ [MH]$^+$, calculated 452.17 g/mol. found 451.96 g/mol.

PEG-Fluorinated Amines 27b, 27c

Compound 27c was prepared in the same way as compound 7a via one-pot hydrogenation of the corresponding azide, and was isolated as a yellow oil in 65% yield. 7b was prepared from the azide precursor 28b, which was first purified and subjected to two different conditions for hydrogenation. Both conditions gave the product as a clear oil. Using EtOH as a solvent gave compound 27b with 68% yield. Using DMF as a solvent gave compound 27b with 72% yield. Compound 27b. $^1H$ NMR (500 MHz, $CDCl_3$): δ 3.99 (t, $^3J_{H,F}$=14.3 Hz, 2H, $CH_2OCH_2CF_2$), 3.78-3.76 (m, 2H), 3.70-3.63 (m, 12H), 3.56-3.54 (m, 2H), 3.39 (s, 3H, $CH_3O$), 3.31 (t, $^3J_{H,F}$=15.3 Hz, 2H, $NCH_2CF_2$), 1.56 (br, 2H, $CF_2CH_2NH_2$). $^{13}C$ NMR (126 MHz, $CDCl_3$): δ=120.26-109.56 (m, $CF_2$), 72.34, 72.02, 70.79-70.60, 68.36 (t, $^2J_{C,F}$=24.5 Hz, $CF_2CH_2OCH_2$), 59.08 (s, $CH_3O$), 43.05 (t, $^3J_{C,F}$=24.6 Hz, $CF_2CH_2NH_2$). $^{19}F$ NMR (470 MHz, $CDCl_3$): δ=−119.84 (m, 2F), −121.62 (m, 2F,), −122.04 −122.01 (m, 2F), −122.15 (m, 2F), −123.56 (m, 2F), −123.70 (m, 2F). FT-IR ($cm^{-1}$, in $CHCl_3$): v=3408, 3340, 2875, 1632, 1456, 1350, 1284, 1234, 1141, 956, 881. MALDI-TOF for $C_{14}H_{25}F_6NP_5$ [MH]$^+$: calculated 402.17 g/mol. found 402.04 g/mol. Compound 27c. $^1H$ NMR (500 MHz, $CDCl_3$): δ 4.02 (t, $^3J_{H,F}$=14.0 Hz, 2H, $CH_2OCH_2CF_2$), 3.77-3.75 (m, 2H), 3.66-3.61 (m, 12H), 3.53-3.52 (m, 2H), 3.36 (s, 3H, $CH_3O$), 3.24 (t, $^3J_{F,LF}$=15.8 Hz, 2H, $NCH_2CF_2$), 1.28 (br, 2H, $CF_2CH_2NH_2$). $^{13}C$ NMR (126 MHz, $CDCl_3$): δ=118.78-108.75 (m, $CF_2$), 72.43, 72.03, 70.83-70.58, 68.43 (t, $^2J_{C,F}$=25.43 Hz, $CF_2CH_2OCH_2$), 59.08 (s, $CH_3O$), 42.96

(t, $^3J_{C,F}$=23.5 Hz, CF$_2$CH$_2$NH$_2$). $^{19}$F NMR (470 MHz, CDCl$_3$): δ=−119.84 (m, 2F), −121.62 (m, 2F,), −122.04−122.01 (m, 2F), −122.15 (m, 2F), −123.56 (m, 2F), −123.70 (m, 2F). FT-IR (cm$^{-1}$, in CHCl$_3$): ν=3411, 3348, 2881, 1632, 1458, 1351, 1200-1141, 960, 840. MALDI-TOF for C$_{17}$H$_{25}$F$_{12}$NP$_5$ [MNa]$^+$: calculated 574.14 g/mol. found 574.12 g/mol.

PEG-Fluorinated Azide 28a

To a solution of compound 25a (194 mg, 0.34 mmol) in DMF (1.5 mL), sodium azide (26.7 mg, 0.41 mmol) was added under nitrogen. The reaction mixture was stirred for 6.5 hours. The reaction mixture was poured over H$_2$O (2 mL) and extracted with Et$_2$O (2 mL×3). The combined organic fraction was washed with H$_2$O (6 mL×3) and dried over MgSO$_4$. The solvent was removed under reduced pressure to obtain compound 28a as a light-yellow liquid (136 mg, 84%). $^1$H NMR (500 MHz, CDCl$_3$): δ 4.02 (t, $^3J_{H,F}$=14.3 Hz, 2H, CH$_2$OCH$_2$CF$_2$), 3.79-3.77 (m, 2H), 3.75 (t, $^3J_{H,F}$=14.6 Hz, 2H, N$_3$CH$_2$CF$_2$), 3.68-3.63 (m, 12H), 3.55-3.53 (m, 2H), 3.38 (s, 3H, CH$_3$O). $^{13}$C NMR (125 MHz, CDCl$_3$): δ=117.97-108.79 (m, CH$_2$), 72.38, 72.00, 70.79, 70.75, 70.68, 70.66, 70.58, 68.38 (t, $^3J_{C,F}$=24.6 Hz, CF$_2$CH$_2$OCH$_2$), 59.04 (s, CH$_3$O), 50.18 (t, $^3J_{C,F}$=23.9 Hz, CH$_2$N$_3$). $^{19}$F NMR (470 MHz, CDCl$_3$): δ=−118.08 (m, 2F), −120.32 (m, 2F), −123.95 (m, 2F), −124.11 (m, 2F). FT-IR (cm$^{-1}$, in CDCl$_3$): ν=2881, 2113, 1456, 1123, 960, 857. MALDI-TOF for C$_{15}$H$_{24}$F$_8$N$_3$O$_5$ [MH]$^+$, calculated 478.16 g/mol. found 478.02 g/mol.

PEG-Fluorinated Azide 28b, 28c

Compounds 28b, 28c were prepared in a similar way as 28a to afford >99% and 87% as yields, respectively. Compound 28b. $^1$H NMR (500 MHz, CDCl$_3$): δ 4.01 (t, $^3J_{H,F}$=14.4 Hz, 2H, CH$_2$OCH$_2$CF$_2$), 3.78-3.75 (m, 2H), 3.77 (t, $^3J_{H,F}$=14.6 Hz, 2H, N$_3$CH$_2$CF$_2$), 3.68-3.63 (m, 12H), 3.55-3.53 (m, 2H), 3.37 (s, 3H, CH$_3$O). $^{13}$C NMR (125 MHz, CDCl$_3$): δ=117.97-108.58 (m, CH$_2$), 72.13, 71.84, 70.68, 70.60, 70.54, 70.51, 70.49, 70.41, 68.04 (t, $^3J_{C,F}$=24.9 Hz, CF$_2$CH$_2$OCH$_2$), 58.83 (s, CH$_3$O), 50.06 (t, $^3J_{C,F}$=23.5 Hz, CH$_2$N$_3$). $^{19}$F NMR (470 MHz, CDCl$_3$): δ=−118.30 (m, 2F), −120.21 (m, 2F), −126.43 (m, 2F). FT-IR (cm$^{-1}$, in CDCl$_3$): ν=2881, 2114, 1653, 1457, 1306, 1148, 956. MALDI-TOF for C$_{14}$H$_{24}$F$_6$N$_3$O$_5$ [MH]$^+$, calculated 428.1620 g/mol. found 428.1664 g/mol. Compound 28c. $^1$H NMR (500 MHz, CDCl$_3$): δ 4.04 (t, $^3J_{H,F}$=14.0 Hz, 2H, CH$_2$OCH$_2$CF$_2$), 3.80-3.77 (m, 2H), 3.77 (t, $^3J_{H,F}$=15.6 Hz, 2H, N$_3$CH$_2$CF$_2$), 3.68-3.63 (m, 12H), 3.56-3.54 (m, 2H), 3.38 (s, 3H, CH$_3$O). $^{13}$C NMR (125 MHz, CDCl$_3$): δ=117.97-108.58 (m, CH$_2$), 72.13, 71.84, 70.68, 70.60, 70.54, 70.51, 70.49, 70.41, 68.04 (t, $^3J_{C,F}$=24.9 Hz, CF$_2$CH$_2$OCH$_2$), 58.83 (s, CH$_3$O), 50.06 (t, $^3J_{C,F}$=23.5 Hz, CH$_2$N$_3$). $^{19}$F NMR (470 MHz, CDCl$_3$): δ=−117.88 (m, 2F), −120.19 (m, 2F), −122.30 (m, 2F), −122.50 (m, 2F), −123.66 (m, 2F), −123.88 (m, 2F). FT-IR (cm$^{-1}$, in CDCl$_3$): ν=2881, 2114, 1456, 1142, 958. MALDI-TOF for C$_{17}$H$_{24}$F$_{12}$N$_3$O$_5$ [MH]$^+$, calculated 578.1524 g/mol. found 577.9730 g/mol.

PEG-Fluorinated-Guanyldinium Mono TFA Salt 29b

To a solution of compound 27b (161.6 mg, 0.4 mmol) in DMF (0.4 mL), Hünig's base (0.14 mL, 0.8 mmol) and 1H-pyrazole-1-carboxamidine hydrochloride (117.3 mg, 0.8 mmol) were added and the reaction was stirred vigorously. Another addition of Hünig's base and 1H-pyrazole-1-carboxamidine hydrochloride was made at 72 hours. Another aliquot of Hünig's base and 1H-pyrazole-; 11-carboxamidine hydrochloride was added at 6 days and every 24 hours thereafter to drive the reaction to completion. NMR and MALDI confirmed the completion of the reaction at 11 days. The solvent was removed under reduced pressure. The crude product was obtained as a yellow gum, which was then suspended in H$_2$O and passed through an IRN-78 ion-exchange column to neutralize the hydrochloride. The resulting crude product was separated with reverse phase chromatography (MeOH/H$_2$O, 0.1% TFA) to afford a light yellow oil as the product in mono-TFA salt form (126.8 mg, 57%). Compound 29b. $^1$H NMR (500 MHz, 55° C., CDCl$_3$): δ8.62 (br, 1H, H$_2$NCNHNH$_2$), 7.37 (br, 4H, H$_2$NCNHNH$_2$), 3.96 (t, $^3J_{H,F}$=13.4 Hz, 2H, CH$_2$OCH$_2$CF$_2$), 3.92 (NHCH$_2$CF$_2$), 3.77-3.75 (m, 2H), 3.65-3.62 (m, 12H), 3.55-3.53 (m, 2H), 3.34 (s, 3H, CH$_3$O). $^{13}$C NMR (126 MHz, CDCl$_3$): δ=158.9 (s, C=N), 117.9-109.2 (m, CF$_2$CF$_2$CF$_2$), 72.3, 71.8, 70.5-70.2, 68.2 (t, $^2J_{C,F}$=26.0 Hz, CF$_2$CH$_2$OCH$_2$), 58.7 (s, CH$_3$O), 42.1 (t, $^2J_{C,F}$=22.1 Hz, CF$_2$CH$_2$NH$_2$). $^{19}$F NMR (470 MHz, CDCl$_3$): δ=−75.78 (s, 3F, HOOCCF$_3$), −117.86 (m, 2F), −119.32 (m, 2F), −127.35 (m, 2F). FT-IR (cm$^{-1}$, in CHCl$_3$): ν=3354-3015, 2921, 1684, 1457, 1204, 1150-1136, 755. MALDI-TOF for C$_{15}$H$_{27}$F$_6$N$_3$O$_5$ [MH]$^+$: calculated 444.19 g/mol. found 444.07 g/mol.

PEG-Fluorinated-Guanyldinium Mono TFA Salts 29a and 29c

Compounds 29a and 29c were prepared in a way similar to 29b to give the corresponding mono TFA salt product with 92% and 56% yields, respectively. Both 29a and 29c are light yellow oil. Compound 29a. $^1$H NMR (500 MHz, 55° C., CDCl$_3$): δ8.28 (br, 1H, H$_2$NCNHNH$_2$), 7.34 (br, 4H, H$_2$NCNHNH$_2$), 3.97 (t, $^3J_{H,F}$=14.0 Hz, 2H, CH$_2$OCH$_2$CF$_2$), 3.93 (NHCH$_2$CF$_2$), 3.74-3.73 (m, 2H), 3.66-3.60 (m, 12H), 3.54-3.52 (m, 2H), 3.33 (s, 3H, CH$_3$O). $^{13}$C NMR (126 MHz, CDCl$_3$): δ=158.72 (s, C=N), 117.82-108.96 (m, CF$_2$CF$_2$CF$_2$CF$_2$), 72.21, 71.78, 70.50-70.13, 68.24 (t, $^2J_{C,F}$=24.3 Hz, CF$_2$CH$_2$OCH$_2$), 58.55 (s, CH$_3$O), 41.84 (t, $^2J_{C,F}$=23.54 Hz, CF$_2$CH$_2$NH$_2$). $^{19}$F NMR (376 MHz, CDCl$_3$): δ=−75.98 (s, 3F, HOOCCF$_3$), −117.81 (m, 2F), −119.72 (m, 2F), −123.55 (m, 2F), −123.58 (m, 2F,). FT-IR (cm$^{-1}$, in CHCl$_3$): ν=3356-3014, 2920, 1684, 1457, 1177, 1132, 759. MALDI-TOF for C$_{16}$H$_{27}$F$_8$N$_3$O$_5$ [MNa]$^+$: calculated 494.19 g/mol. found 494.06 g/mol. Compound 29c. $^1$H NMR (500 MHz, 55° C., CDCl$_3$): δ8.34 (br, 1H, HOOCCF$_3$), 7.41 (br, 4H, H$_2$NCNHNH$_2$), 3.97 (t, $^3J_{H,F}$=13.4 Hz, 2H, CH$_2$OCH$_2$CF$_2$), 3.93 (NHCH$_2$CF$_2$), 3.75-3.73 (m, 2H), 3.65-3.59 (m, 12H), 3.53-3.51 (m, 2H), 3.33 (s, 3H, CH$_3$O). $^{13}$C NMR (126 MHz, 55° C., CDCl$_3$): δ=158.88 (s, C=N), 118.15-108.56 (m, CF$_2$CF$_2$CF$_2$CF$_2$CF$_2$CF$_2$), 72.31, 71.86, 70.61-70.26, 68.33 (t, $^2J_{C,F}$=24.4 Hz, CF$_2$CH$_2$OCH$_2$), 58.60 (s, CH$_3$O), 41.75 (t, $^2J_{C,F}$=25.16 Hz, CF$_2$CH$_2$NH$_2$). $^{19}$F NMR (470 MHz, 55° C., CDCl$_3$): δ=−76.07 (S, SCF$_3$), −117.875 (m, 2F), −119.74 (m, 2F), −121.81 (m, 2F), −122.02 (m, 2F), −123.22 (m, 2F), −123.57 (m, 2F). FT-IR (cm$^{-1}$, in CHCl$_3$): ν=3360-3184, 3020, 2904, 1684, 1216-1144, 761. MALDI-TOF for C$_{18}$H$_{27}$F$_{12}$N$_3$O$_5$ [MH]$^+$: calculated 594.18 g/mol. found 593.99 g/mol.

Triflate 10

To a solution of diol 21 (5.0 g, 19.1 mmol) in dry dichloromethane (200 mL), trifluoromethanesulfonyl chloride (4.9 mL, 45.8 mmol) was added under a nitrogen atmosphere in an ice bath. Triethylamine (10.7 mL, 76.3 mmol) was then added dropwise. A yellow precipitate was observed. The mixture was stirred at room temperature overnight. The solvent was then removed and the crude compound was dissolved in ethyl acetate (200 mL) and washed twice with water (100 mL). The phases were separated, and the organic phase was washed sequentially with 1M HCl (200 mL), NaHCO$_3$ (200 mL), and brine and then dried with MgSO$_4$ and filtered. The solvent was removed under reduced pressure to yield a yellow oil. It was then crystallized from 3:1 hexanes:ethyl acetate to yield compound 28 as clear crystals (9.4 g, 94%). mp. 57.5-58.5° C. $^1$H NMR (400 MHz, CDCl$_3$): δ=4.82 (t, $^3J_{H,F}$=12.1 Hz, 4H, $CF_3SO_2OCH_2CF_2$). $^{13}C$ NMR (150 MHz, $CDCl_3$): δ=118.42 (q, $^1J_{C,F}$=320.1 Hz, $CF_3SO_2$), 115.5 (t, $CF_2$), 113.6-112.6 (m, $CF_2$), 111.3-109.9 (m, $CF_2$), 108.0 (t, $^2J_{C,F}$=32.9 Hz, $CF_2$), 68.07 (t, $^2J_{C,F}$=28.4 Hz, $OCH_2$). $^{19}F$ NMR (376 MHz, $CDCl_3$): δ=−123.35 (m, 4F, $CF_2CF_2CH_2$), −120.1 (m, 4F, $CF_2CH_2O$), −74.3 (s, 6F, $CF_3SO_2$). FT-IR (cm$^{-1}$, in $CHCl_3$): ν=3683, 3020, 2400, 1519, 1429, 1220, 931, 761. Anal. Calc'd for $C_8H_4F_{14}O_4S_2$: C, 18.26; H, 0.77. Found: C, 19.87; H, 0.77.

Dibromide 31a

To a solution of compound 30 (100 mg, 0.18 mmol) in DMF (1.2 mL), potassium bromide (50.8 mg, 0.43 mmol) and 18-crown-6 (14.6 mg, 0.054 mmol) were added under $N_2$ atmosphere. After 6 hours of stirring, KBr (25 mg) was added and the reaction was allowed to continue for another 26 hours. The reaction mixture was poured over $H_2O$ (3.6 mL), extracted with ether (2.4 mL×3), washed with $H_2O$ (7.2 mL×3) and dried over $MgSO_4$. Solvent was removed under reduced pressure to afford the compound 23a as a clear oil (56.1 mg, 81%). $^1H$ NMR (500 MHz, $CDCl_3$): δ=3.76 (t, $^3J_{H,F}$=15.6 Hz, 4H, $BrCH_2CF_2$). $^{13}C$ NMR (126 MHz, $CDCl_3$): δ=113.99 (tt, $^1J_{C,F}$=257.25 Hz, $^2J_{C,F}$=31.8 Hz, $CH_2CF_2$), 110.91 (tq $^1J_{C,F}$=268.01 Hz, $^2J_{C,F}$=31.3 Hz, $CH_2CF_2CF_2$), 26.05 (t, $^2J_{C,F}$=25.4 Hz, $BrCH_2$). $^{19}F$ NMR (470 MHz, $CDCl_3$): δ=−113.10 (m, 4F, $CF_2CF_2CH_2$), −122.03 (m, 4F, $CF_2CF_2CH_2$). FT-IR (cm$^{-1}$, in $CHCl_3$): ν=2987, 2961, 2932, 1727, 1428, 1287-1072, 875. GC/MS for $C_6H_4Br_2F_8$ [M]$^+$: calculated 385.8552 g/mol. found 385.8544 g/mol.

Malonocycloheptane 31b

In a 3-neck round bottom flask, potassium hydride (26.8 mg, 0.67 mmol, in mineral oil) was washed with pentane. DMF (1.8 mL) was then added. To this suspension of KH in DMF under vigorous stirring, dimethylmalonate (88.2 mg, 0.67 mmol) was added slowly. After 1 hour, compound 30 (150 mg, 0.27 mmol) was added to the resulting enolate and the reaction was stirred for 12 hours. After that, another aliquot of enolate was added, and the reaction was allowed to stir for 24 hours longer. The reaction mixture was poured over $H_2O$ (3.6 mL) and extracted with ether (3.6 mL×3). The combined organic fractions were washed with $H_2O$ (9 mL×3) and dried over $MgSO_4$. The solvent was removed under reduced pressure. The crude product was purified by chromatography (7:1 benzene:ethyl acetate, $R_f$=0.74) to separate unreacted starting material, then further purified by a second chromatography (4:1 hexanes:ethyl acetate, $R_f$=0.59) to obtain a clear liquid, which crystallized on standing. The crystal sublimes at room temperature. Yield: 54.3 mg, 57%, mp. 67.5-69° C. $^1H$ NMR (400 MHz, $CDCl_3$): δ=3.83 (s, 6H, $CH_3COC$), 3.20 (t, $^3J_{H,F}$=15.1 Hz, 4H, $CCH_2CF_2$). $^{13}C$ NMR (126 MHz, $CDCl_3$): δ=168.42 (s, $CH_3COC$), 117.78-113.72 (tt, $^1J_{C,F}$=254.4 Hz, $^2J_{C,F}$=27.9 Hz, $CH_2CF_2$), 111.38-107.08 (tq, $^1J_{C,F}$=229.8 Hz, $^2J_{C,F}$=27.8 Hz, $CH_2CF_2CF_2$), 54.44 (s, $CH_3CO$), 33.02 (t, $^2J_{C,F}$=24.7 Hz, $CH_2CF_2$. $^{19}F$ NMR (470 MHz, $CDCl_3$): δ=−111.41 (m, 4F, $CF_2CF_2CH_2$), −120.1 (m, 4F, $CF_2CH_2O$), −74.3 (s, 6F, $CF_3SO_2$). FT-IR (cm$^{-1}$, in $CHCl_3$): ν=3021, 2958, 1748, 1438, 1345, 1282, 1216, 1180, 1117, 1076, 1016, 932, 756, 668. GC/MS for $C_{10}H_7F_8O_3$ [M-OMe]$^+$ calculated 327.03. found 327.08 g/mol; $C_9H_7F_8O_2$ [M-$CO_2Me$]$^+$ calculated 299.03. found 299.08 g/mol.

Phthalimide 31c

To a solution of compound 30 (3.0 g, 5.7 mmol) in dry N,N-dimethylformamide (300 mL), potassium phthalimide (2.53 g, 13.7 mmol) was added under nitrogen atmosphere. The mixture was stirred at 85° C. overnight. The reaction mixture was cooled down to room temperature and 300 mL of brine was added. The product precipitated as a white solid and was collected by filtration (2.6 g, 89%). Decomp. temp and mp. 260.5-262° C. $^1H$ NMR (400 MHz, $CDCl_3$): δ=7.93 (q, $^3J_{H,H}$=2.8 Hz, Ar, 4H), 7.78 (q, $^3J_{H,H}$=2.8 Hz, Ar, 4H), 4.38 (t, $^3J_{H,F}$=15.6 Hz, 4H, $NCH_2CF_2$). $^{13}C$ NMR (100 MHz, $CDCl_3$): δ=166.8 (s, Ar), 134.5 (s, Ar), 131.8 (s, Ar), 123.9 (s, Ar), 37.6 (t, $^3J_{C,F}$=25.1 Hz, $NCH_2$). $^{19}F$ NMR (376 MHz, $CDCl_3$): δ=−123.5--123.6 (m, 4F, $CF_2CF_2CH_2$), −116.4-- (116.6) (m, 4F, $CF_2CH_2N$). Anal. Calc'd for $C_{13}H_{13}O_4N$: C, 50.78; H, 2.32; N, 5.38. Found: C, 50.73; H, 2.03; 5.05. FT-IR (cm$^{-1}$, in $CHCl_3$): ν=3019, 2400, 1522, 1424, 1216, 930, 759. This data is consistent with a previously-reported compound.

Azide 31d

To a solution of compound 30 (150 mg, 0.267 mmol) in DMF (1.8 mL), $NaN_3$ (41.6 mg, 0.64 mmol) was added under $N_2$ atmosphere. The reaction was stirred for 3 hours. The reaction mixture was then poured over of $H_2O$ (3.6 mL) and extracted with ether (3.6 mL×3). The combined organic fractions were then washed with $H_2O$ (10 mL×3) and dried over $MgSO_4$. The solvent was removed under reduced pressure to yield a colorless oil (83.3 mg, >99%). $^1H$ NMR (500 MHz, $CDCl_3$): δ=3.77 (t, $^3J_{H,H}$=14.7 Hz, 4H, $CH_2CF_2CF_2$). $^{13}C$ NMR (150 MHz, $CDCl_3$): δ=115.73 (tt, $^1J_{C,F}$=258.9 Hz, $^2J_{C,F}$=30.1 Hz, $N_3CH_2CF_2$), 111.82 (tq, $^1J_{C,F}$=265.87 Hz, $^2J_{C,F}$=33.52 Hz, $NH_2CH_2CF_2CF_2$), 50.20 (t, $^2J_{C,F}$=24.3 Hz, $CH_2N_3$). This data is consistent with a previously-reported compound.

Diamine 32 Via Phthalate Deprotection

Compound 31c (2.3 g, 4.4 mmol) was treated with hydrazine (1.4 mL, 44.4 mmol) in anhydrous ethanol (300 mL) under reflux overnight. After cooling to room temperature, the reaction mixture was filtered to remove the white precipitate. The solvent was then removed under vacuum. The crude product was then stirred in 200 mL chloroform and re-filtered to remove white precipitate. Chloroform was removed by rotary evaporation, and the product was obtained as a white solid. It was sublimated to obtain clear crystals, 0.87 g, 76%. Mp. 47-48° C. $^1H$ NMR (400 MHz, $CDCl_3$): δ=3.24 (t, $^3J_{H,H}$=16.0 Hz, 4H, $CH_2CF_2CF_2$), 1.35-1.18 (b, 4H, $NH_2CH_2CF_2$). $^{13}C$ NMR (150 MHz, $CDCl_3$): δ=118.4-117.8 (m, $CF_2$), 116.5-116.1 (m, $CF_2$), 114.6 (t, $^3J_{C,F}$=28.5 Hz, $CF_2$), 113.4 (t, $^3J_{C,F}$=35.1 Hz, $CF_2$), 111.7 (q, $^3J_{C,F}$=35.1 Hz, $CF_2$), 109.9 (t, $^3J_{C,F}$=35.1 Hz, $CF_2$), 42.9 (t, $^3J_{C,F}$=24.6 Hz, $CH_2NH_2$). $^{19}F$ NMR (376 MHz, $CDCl_3$): δ=(−124.2)-(−124.4) (m, 4F, $CF_2CF_2CH_2$), (−122.1)-(−122.3) (m, 4F, $CF_2CH_2NH_2$). FT-IR (cm$^{-1}$, in $CHCl_3$): ν=3020, 1215, 756. This data is consistent with a previously-reported compound.

Compound 32 can also be prepared via direct hydrogenation using the following procedure:

To a solution of compound 31d (53 mg, 0.17 mmol) and quinoline (0.8 mg) in EtOH (0.85 mL), Lindlar (2.6 mg) was added under nitrogen. A balloon filled with $H_2$ was immediately attached to the reaction. After 6 hr 45 min of stirring, the balloon was removed and the reaction mixture was filtered over a pad of Celite. It was then poured over 1 mL of HCl and extracted with ether (2 mL×1). After adjusting the pH to 13 with saturated NaOH solution, the aqueous phase was extracted with ether (2 mL×3) and dried over $MgSO_4$. The crude product was separated using flash-chromatography (chloroform:MeOH=1:12, $R_f$=0.33) to give compound 32 as a clear crystal which sublimes at room temperature. 26.2 mg, Yield: 59%.

Triazole 33

To a solution of compound 31d (100 mg, 0.32 mmol) in DMF (1 mL), phenylacetylene (78.4 mg, 0.768 mmol), and CuI (9.1 mg, 0.048 mmol) were added sequentially. The reaction was heated at 70° C. for 12 hours. The solution was cooled and the solvent was removed under reduced pressure. The greenish crude product was then re-dissolved in a minimal amount of acetone and passed through a plug of silica gel. The eluent was collected and solvent was removed under reduced pressure to obtain a yellowish solid, which was then triturated with ethyl acetate and hexanes to obtain compound 33 as a white, fluffy solid, 147 mg, 89%. mp. 242.5-245.5° C. $^1$H NMR (599.804 MHz, DMSO): δ=8.74 (s, 1H, NCHC), 7.91-7.90 (m, 2H, Ar, CHCHCH), 7.48-7.49 (m, 2H, Ar, CHCHCHN), 7.38-7.36 (m, 1H, Ar, CHCHCH), 5.62 (t, 4H, $^3J_{H,F}$=15.9 Hz, 4H, CH$_2$CF$_2$CF$_2$). $^{13}$C NMR (150.837 MHz, DMSO): δ=146.79 (s, CCNCH), 130.02 (s, CHCC), 128.98 (s, Ar, CHCHCH), 128.25 (s, Ar, CHCHCH), 125.34, (s, Ar, CHCHC), 123.50 (s, CCHN), 116.3-112.9 (tm, $^1J_{C,F}$=260.5, CF$_2$), 112.5-109.0 (tm, $^1J_{C,F}$=270.3, CF$_2$), 48.5 (t, $^2J_{C,F}$=22.5 Hz, CH$_2$N). $^{19}$F NMR (470 MHz, DMSO): δ=−115.93 (m, 4F, CF$_2$CF$_2$CH$_2$), −122.43 (m, 4F, CF$_2$CH$_2$). FT-IR (cm$^{-1}$, in CH$_2$Cl$_2$): v=3052, 2988, 1419, 1265, 897, 737. MALDI-TOF for C$_{22}$H$_{17}$F$_8$N$_6$ [MH]$^+$: calculated 517.14 g/mol. found 517.04 g/mol.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
a) tosylating a compound having formula 1 to form a compound having formula 2:

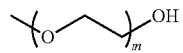

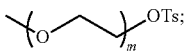

b) reacting a compound having formula (2) with a compound having formula (3) to form a compound having formula (4):

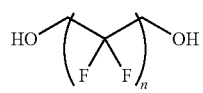

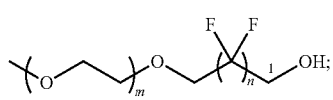

c) converting the hydroxyl group bonded to the carbon labeled "1" of the compound having formula (4) to a leaving group to form a compound having formula (5):

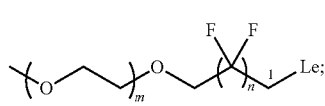

d) reacting the compound having formula (5) with a nucleophile to form the compound having formula (6)

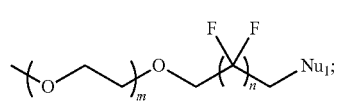

wherein:
Le is a leaving group;
R is a C$_{1-6}$ alkyl;
m is an integer from 3 to 7;
n is an integer from 3 to 10; and
Nu$_1$ is a portion of the nucleophile that bonds to the carbon atom labeled 1.

2. The method of claim 1 wherein in step d) the compound having formula (4) is reacted with trifluoromethanesulfonyl chloride to form a compound having formula (7):

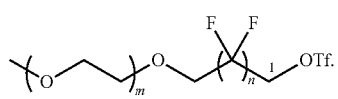

3. The method of claim 1 wherein the nucleophile that is reacted with the compound formula (5) has the following formula:

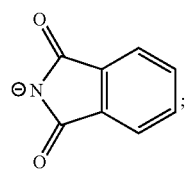

to form a compound having formula (9) has the following formula:

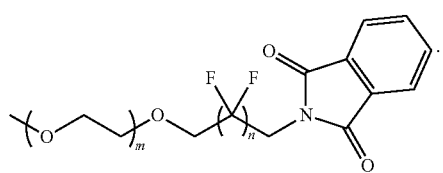

4. The method of claim 3 wherein the compound having formula (9) is converted to a compound having formula (10):

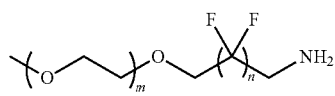

or the amine protonated derivative thereof (10).

5. The method of claim 4 wherein the compound having formula (9) is reacted with hydrazine to form the compound having formula (10).

6. The method of claim 5 wherein the compound having formula (10) is converted to a compound having formula (12):

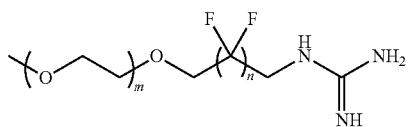

or the imine protonated derivative thereof (12).

7. The method of claim 6 wherein the compound having formula (10) is reacted with a compound having formula (13) to form the compound having formula (12):

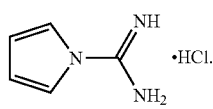
(13)

8. The method of claim 1 wherein the compound having formula (5) is reacted with $N_3^-$ in step d to form a compound having formula (11):

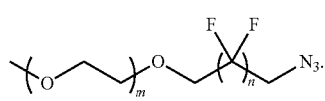
(13)

9. The method of claim 8 wherein the compound having formula (13) is converted to the compound having formula (10):

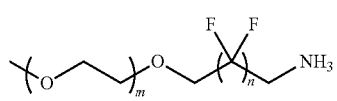

or the amine protonated derivative thereof (10).

10. The method of claim 9 wherein the compound having formula (10) is converted to a compound having formula (12):

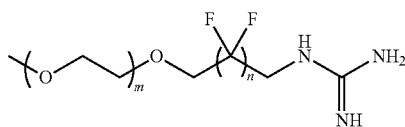

or the imine protonated derivative thereof (12).

11. The method of claim 10 wherein the compound having formula (10) is reacted with a compound having formula (13) to form the compound having formula (12):

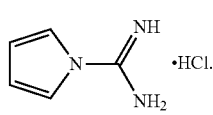
(13)

12. The method of claim 7 or 11 wherein the compound having formula (12) is reacted with a compound having —PO$_2$OR$_2^-$ or —CO$_2^-$ groups to form a complex having formula (15) or (16) respectively:

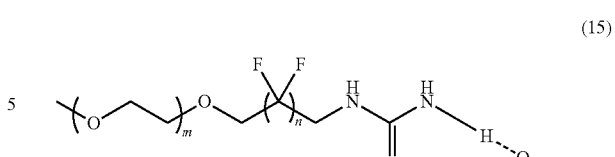
(15)

(16)

wherein R$_1$ is a C$_{8-30}$ hydrocarbon group, a functionalized C$_{8-30}$ hydrocarbon group such that R$_1$ is fully saturated or includes 1 to 4 carbon to carbon double bonds or 1 to 4 carbon to carbon triple bonds or combinations thereof;

R$_2$ is H, a C$_{8-30}$ hydrocarbon group, a functionalized C$_{8-30}$ hydrocarbon group such that R$_1$ is fully saturated or includes 1 to 4 carbon to carbon double bonds or 1 to 4 carbon to carbon triple bonds; and R$_3$ and R$_4$ are each independently a C$_{8-30}$ hydrocarbon group.

13. The method of claim 12 wherein the complex having formula (15) or formula (16) is part of a nanoparticle.

14. The method of claim 13 wherein the nanoparticle includes a paramagnetic atom.

15. The method of claim 14 wherein the paramagnetic atom is gadolinium(III).

16. The method of claim 14 further comprising introducing the nanoparticle into a subject; separating the complex having formula (15) to expose the PO$_3$H$^-$ groups; and imaging the paramagnetic atom by magnetic resonance imaging.

17. A complex having formula (15) or (16):

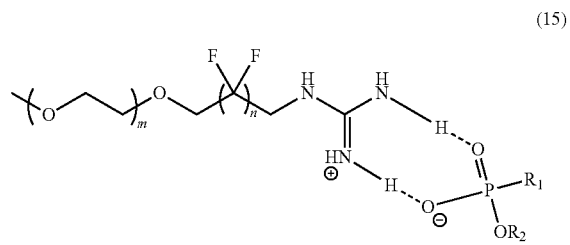
(15)

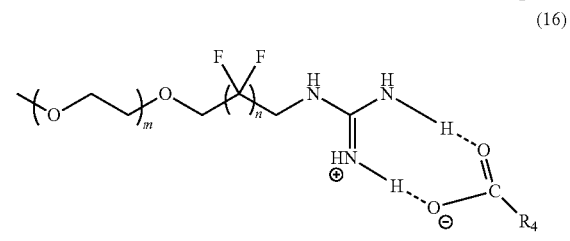
(16)

wherein:
m is an integer from 3 to 7; and
n is an integer from 3 to 10;
R$_1$ is a C$_{8-30}$ hydrocarbon group, a functionalized C$_{8-30}$ hydrocarbon group such that R$_1$ is fully saturated or includes 1 to 4 carbon to carbon double bonds or 1 to 4 carbon to carbon triple bonds or combinations thereof;

$R_2$ is H, a $C_{8-30}$ hydrocarbon group, a functionalized $C_{8-30}$ hydrocarbon group such that $R_1$ is fully saturated or includes 1 to 4 carbon to carbon double bonds or 1 to 4 carbon to carbon triple bonds; and $R_3$ and $R_4$ are each independently a $C_{8-30}$ hydrocarbon group.

* * * * *